United States Patent [19]

Jackson

[11] 4,158,279
[45] Jun. 19, 1979

[54] RIDING MOWER WITH GRASS COLLECTING SYSTEM

[75] Inventor: Harold P. Jackson, McDonough, Ga.

[73] Assignee: McDonough Power Equipment, Inc., McDonough, Ga.

[21] Appl. No.: 784,740

[22] Filed: Apr. 5, 1977

[51] Int. Cl.² ............... A01D 35/72; A01D 35/12
[52] U.S. Cl. ............................ 56/202; 56/16.6; 56/320.2
[58] Field of Search ................ 56/202–206, 56/16.6, 320.1, 320.2; 15/347, 349, 352; 298/22 J, 22 D, 26, 6, 10; 135/4 A, 7.1 A, 7.1 R

[56] References Cited

U.S. PATENT DOCUMENTS

| | | | |
|---|---|---|---|
| 765,432 | 7/1904 | Lehr | 298/6 |
| 831,428 | 9/1906 | Guiry | 298/6 |
| 1,024,959 | 4/1912 | Wolf | 298/6 |
| 1,745,264 | 1/1930 | Margot et al. | 135/4 A |
| 2,579,103 | 12/1951 | Whittaker | 56/200 |
| 2,770,491 | 11/1956 | Perko | 298/10 |
| 2,807,126 | 9/1957 | Bennett | 56/320.2 |
| 3,099,123 | 7/1963 | Price | 56/202 |
| 3,132,457 | 5/1964 | Slemmons | 56/16.6 |
| 3,154,903 | 11/1964 | Smith | 56/15.8 |
| 3,351,384 | 11/1967 | Huck | 298/26 |
| 3,453,812 | 7/1969 | Heidner et al. | 56/320.2 |
| 3,492,800 | 2/1970 | Peterson et al. | 56/202 |
| 3,522,695 | 8/1970 | Musgrave | 56/202 |
| 3,563,257 | 2/1971 | Cummins | 135/4 A |
| 3,574,272 | 4/1971 | Krewson | 56/202 |
| 3,583,138 | 6/1971 | Mattson | 56/202 |
| 3,601,960 | 8/1971 | Burchler | 56/320.2 |
| 3,680,295 | 8/1972 | Rutherford | 56/320.2 |
| 3,706,189 | 12/1972 | Rutherford | 56/320.2 |
| 3,716,977 | 2/1973 | Jackson | 56/202 |
| 3,726,069 | 4/1973 | Cope | 56/320.2 |
| 3,744,228 | 7/1973 | Lundahl | 56/344 |
| 3,797,214 | 3/1974 | Fordmin et al. | 56/202 |
| 3,903,565 | 9/1975 | Hicks | 56/202 |
| 3,934,392 | 1/1976 | Moery et al. | 56/202 |
| 3,961,467 | 6/1976 | Carpenter | 56/320.2 |
| 4,008,559 | 2/1977 | Less et al. | 56/320.2 |

Primary Examiner—Russell R. Kinsey
Assistant Examiner—Paul J. Hirsch
Attorney, Agent, or Firm—William E. Mouzavires

[57] ABSTRACT

A riding mower having an improved blade housing and blade assembly for generating exceedingly high vacuum under the blade housing for facilitating cutting, conveyance and discharge of grass clippings into a two-wheeled cart which trails the mower through means of a hitch. Grass clippings leave and are conveyed from the blade housing to the cart in a straight line through a conduit including telescoping chutes which permit the conduit to elongate or retract to accommodate change in lengths between the blade housing and the cart during operation. The cart has an open top covered by a canopy including a flexible front wall portion which receives an elbow chute to which one of the telescoping discharge chutes is attached. The canopy is pivotally mounted to the front of the cart, and a linkage is provided such that, to discharge the grass clippings, the canopy merely has to be raised through pivoting action which will cause the rear of the cart to pivot downwardly towards the ground as the canopy is being raised so that the contents will discharge by gravity through the rear of the cart. In another use of the mower, the cart is unhitched and another grass collecting assembly is substituted by mounting it directly to frame portions of the mower at its rear. The mower may also be converted for discharging the grass clippings from the blade housing laterally onto the ground without collection.

33 Claims, 23 Drawing Figures

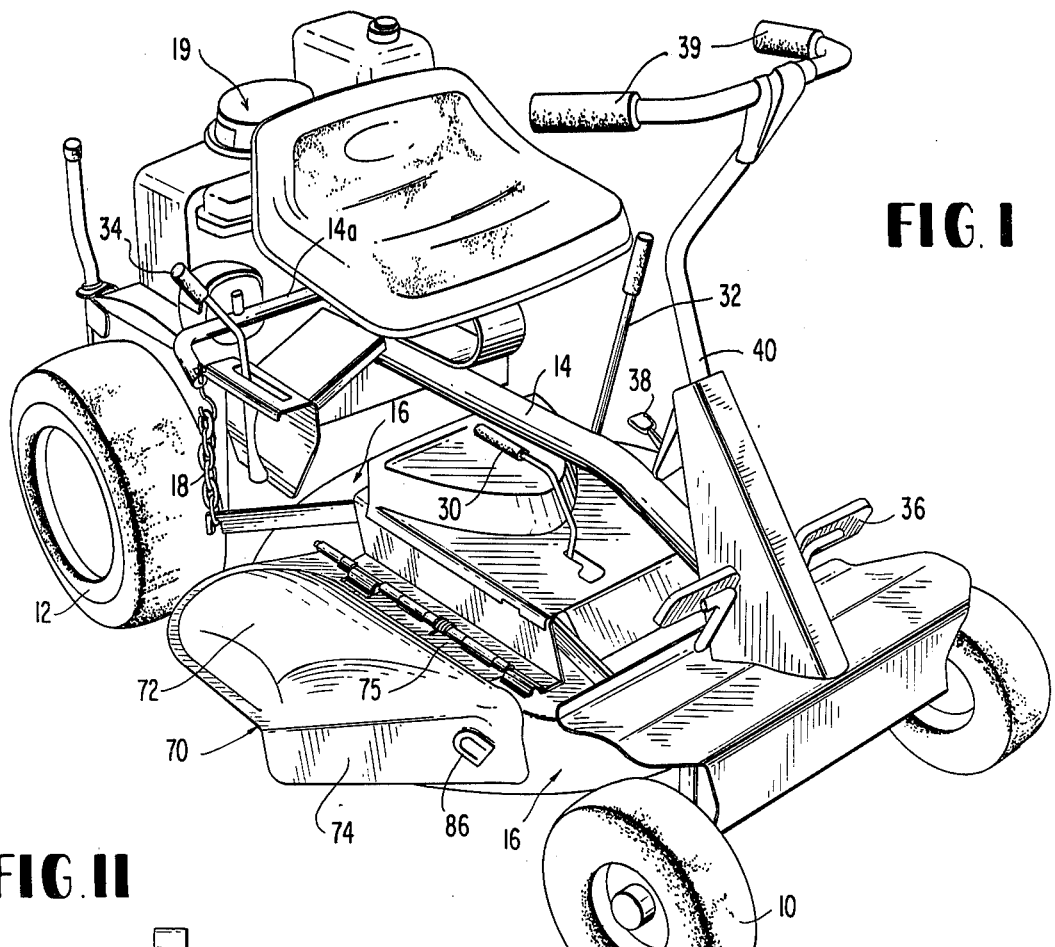
FIG. 1
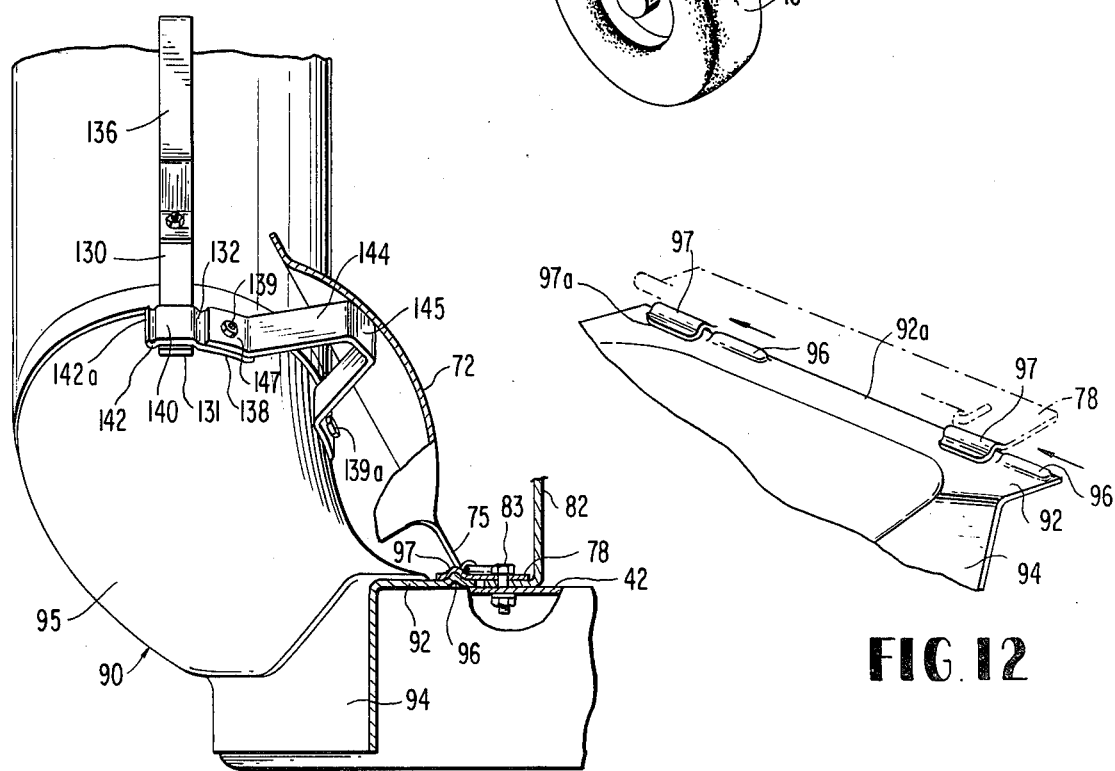
FIG. 11
FIG. 12

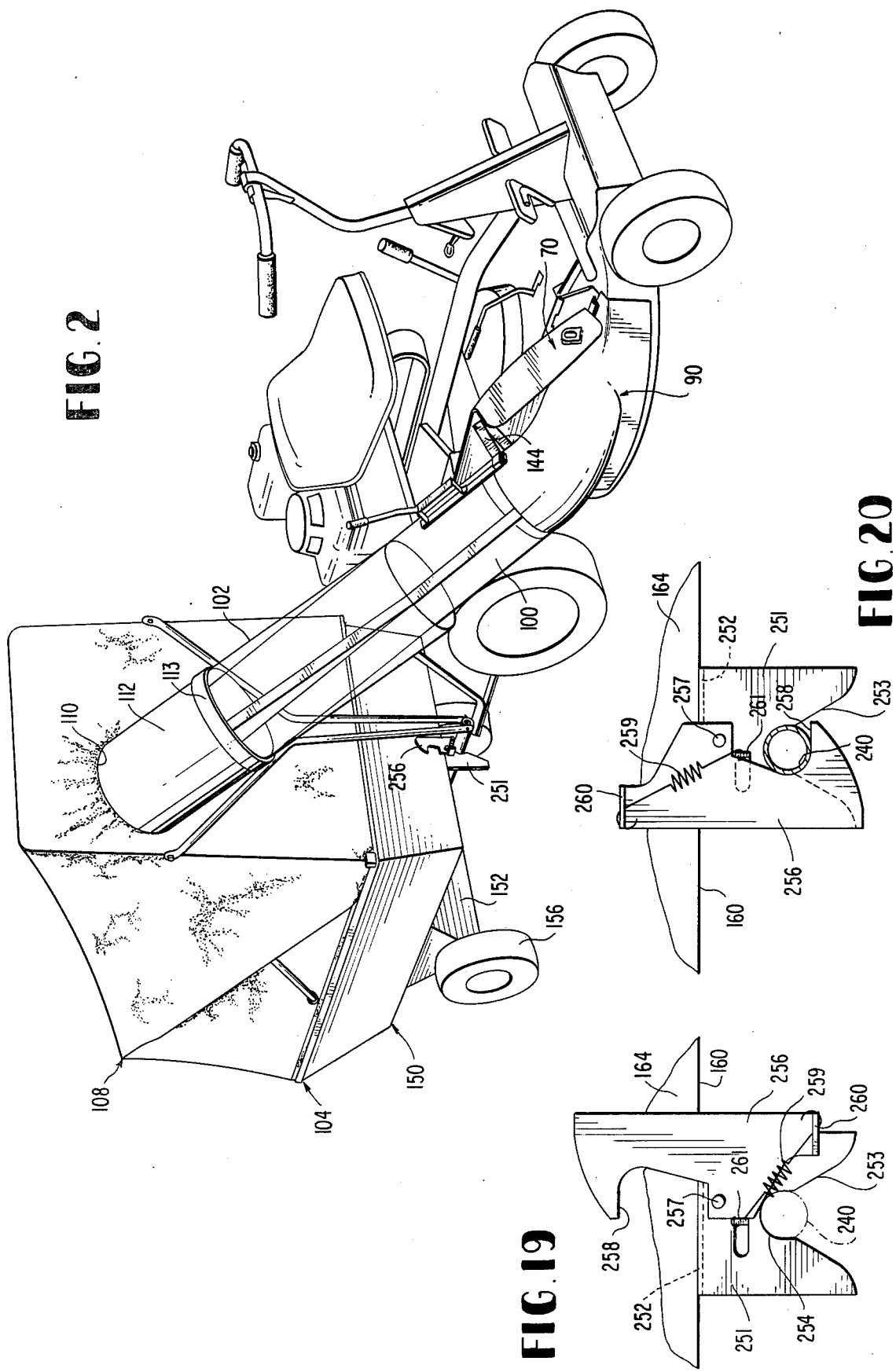

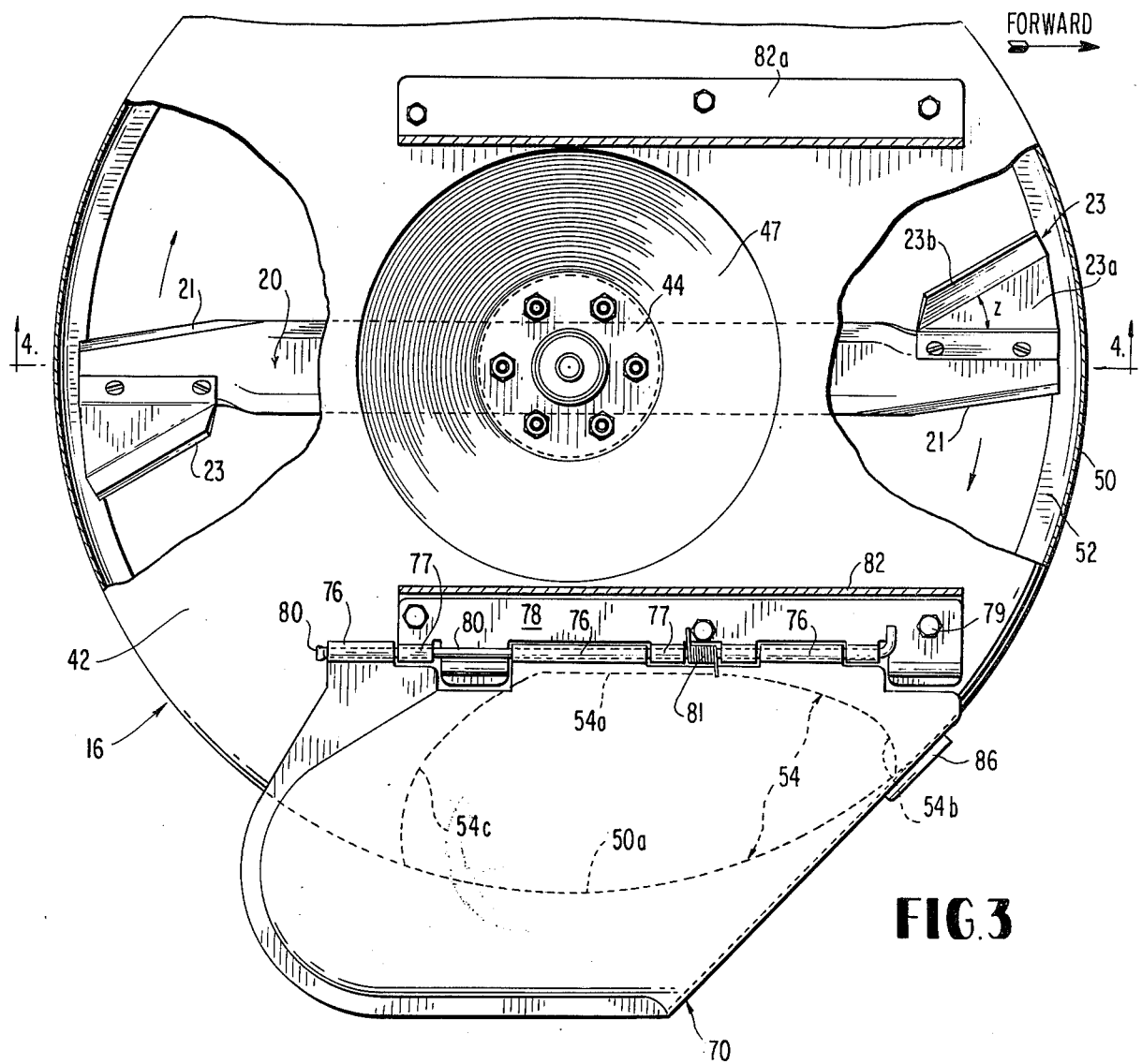
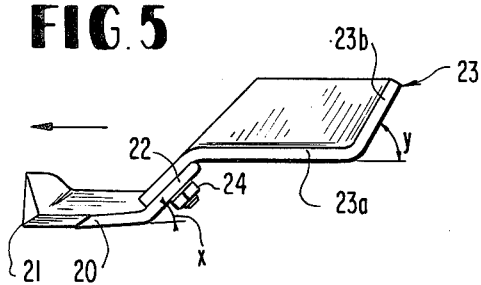
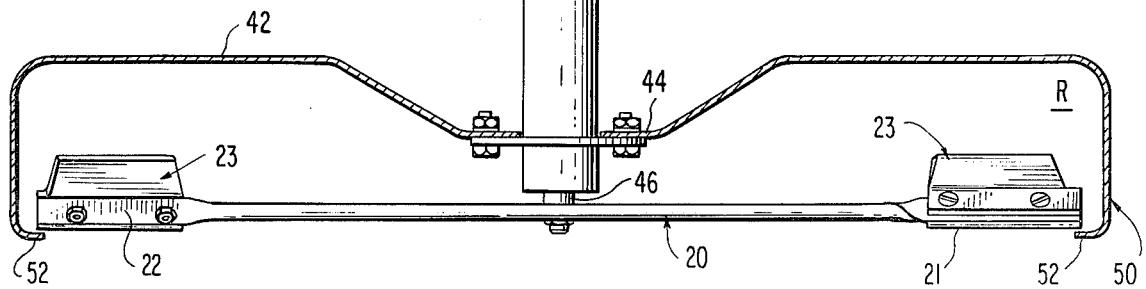

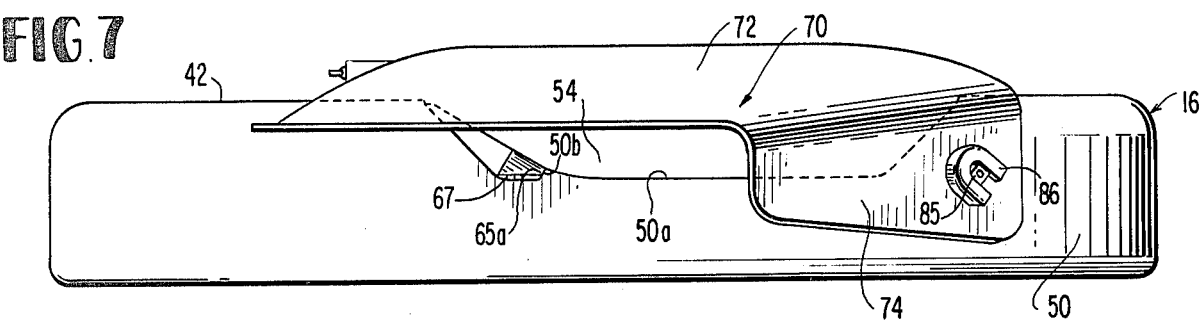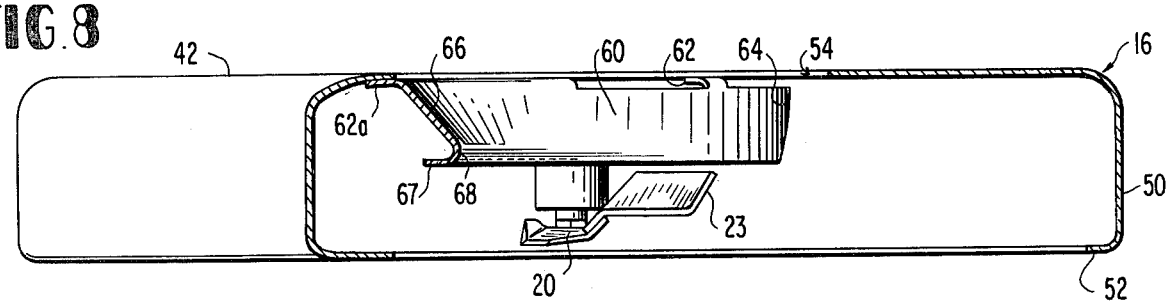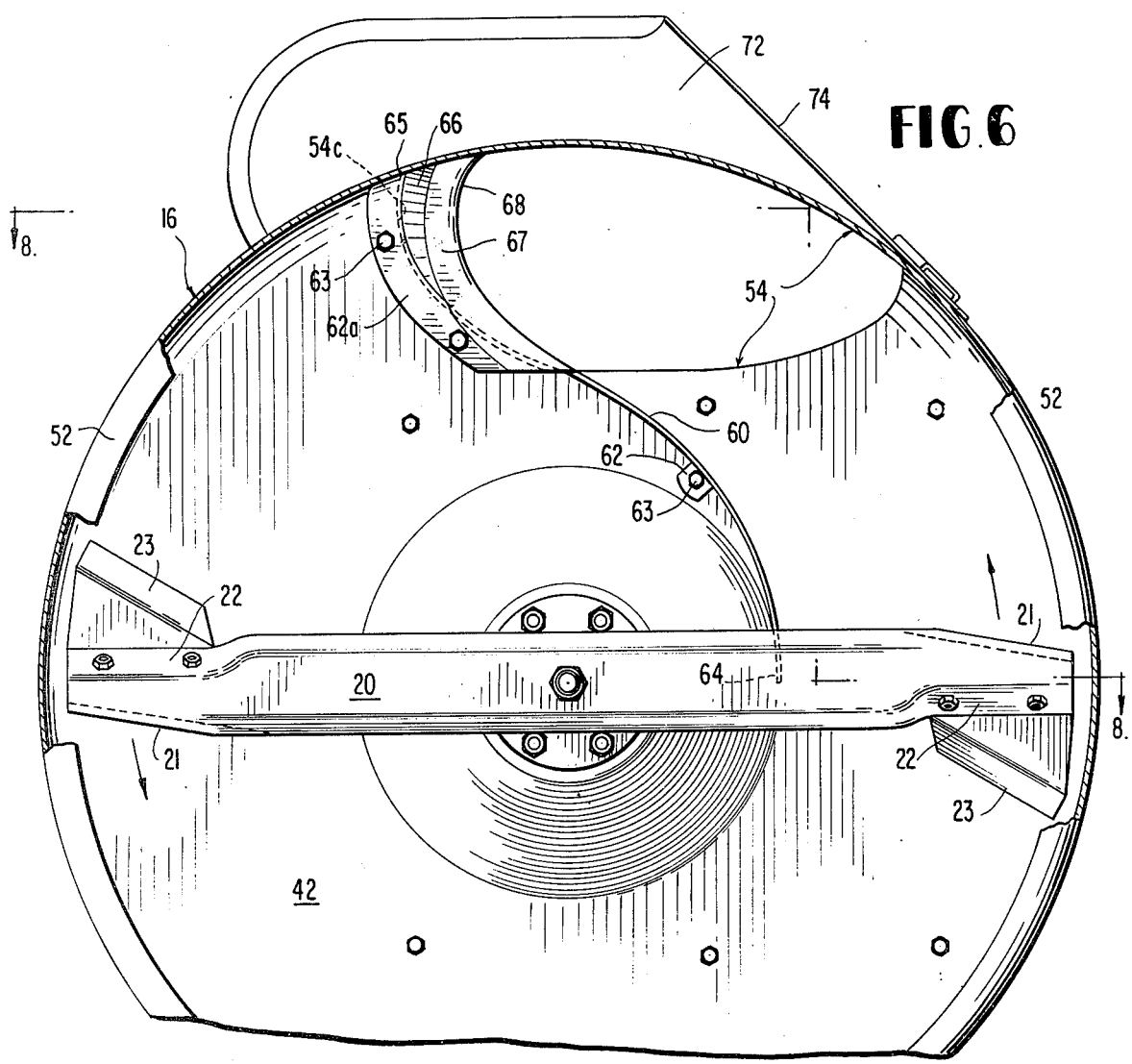

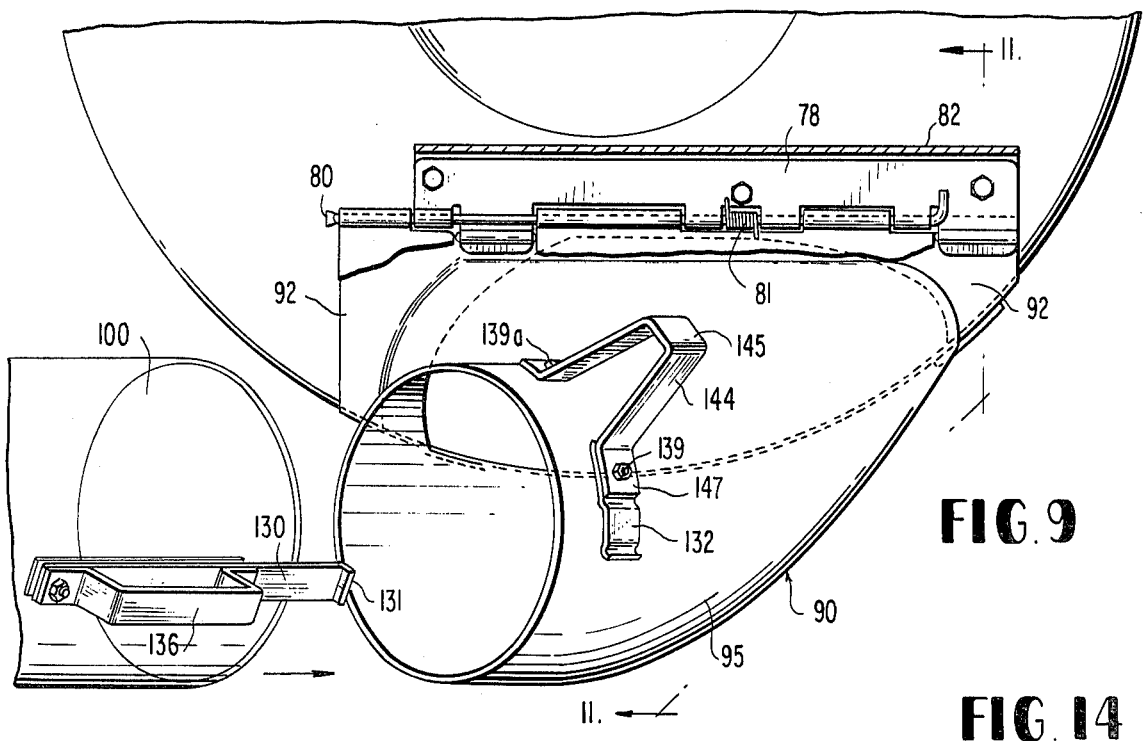
FIG. 9
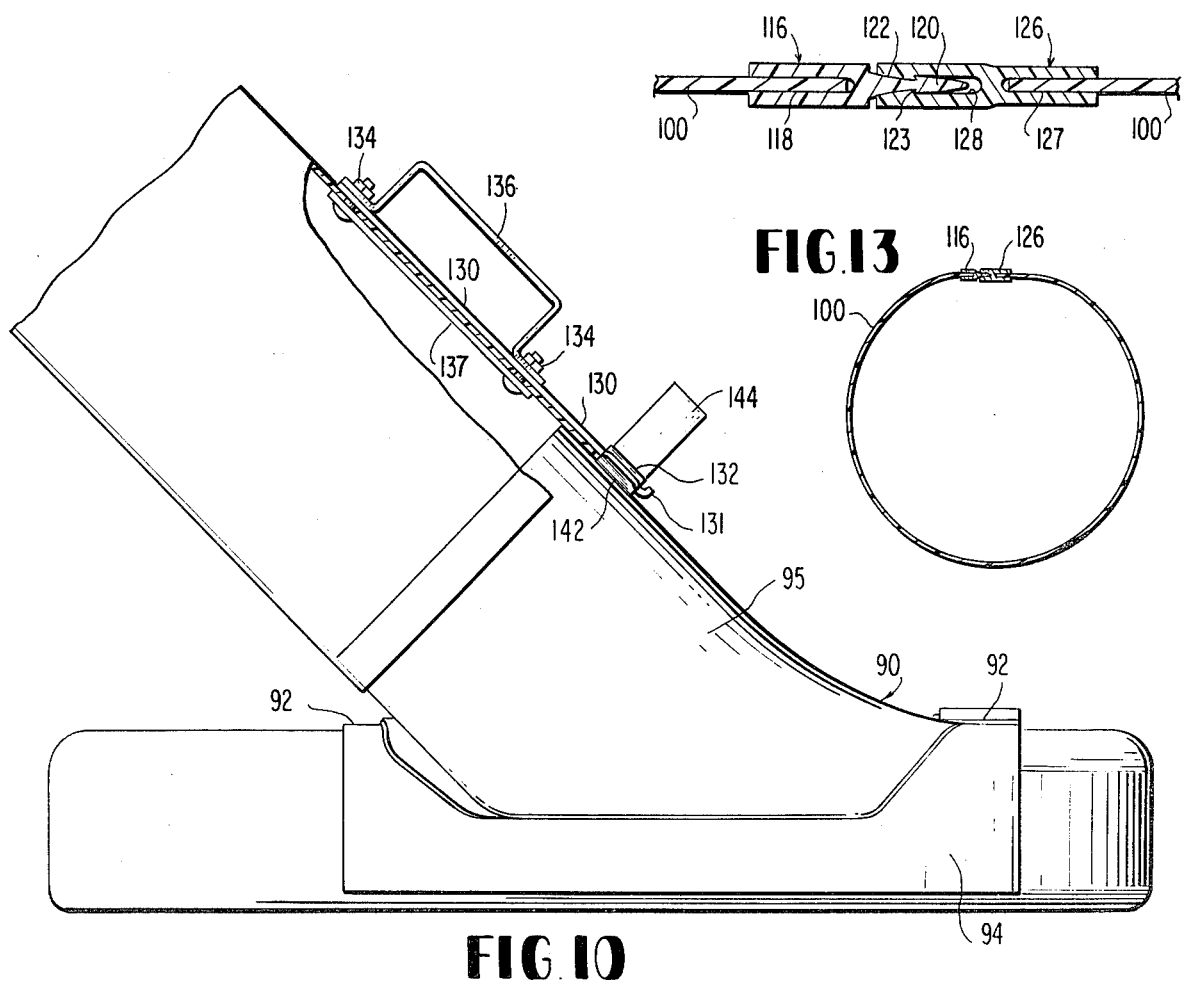
FIG. 14
FIG. 13
FIG. 10

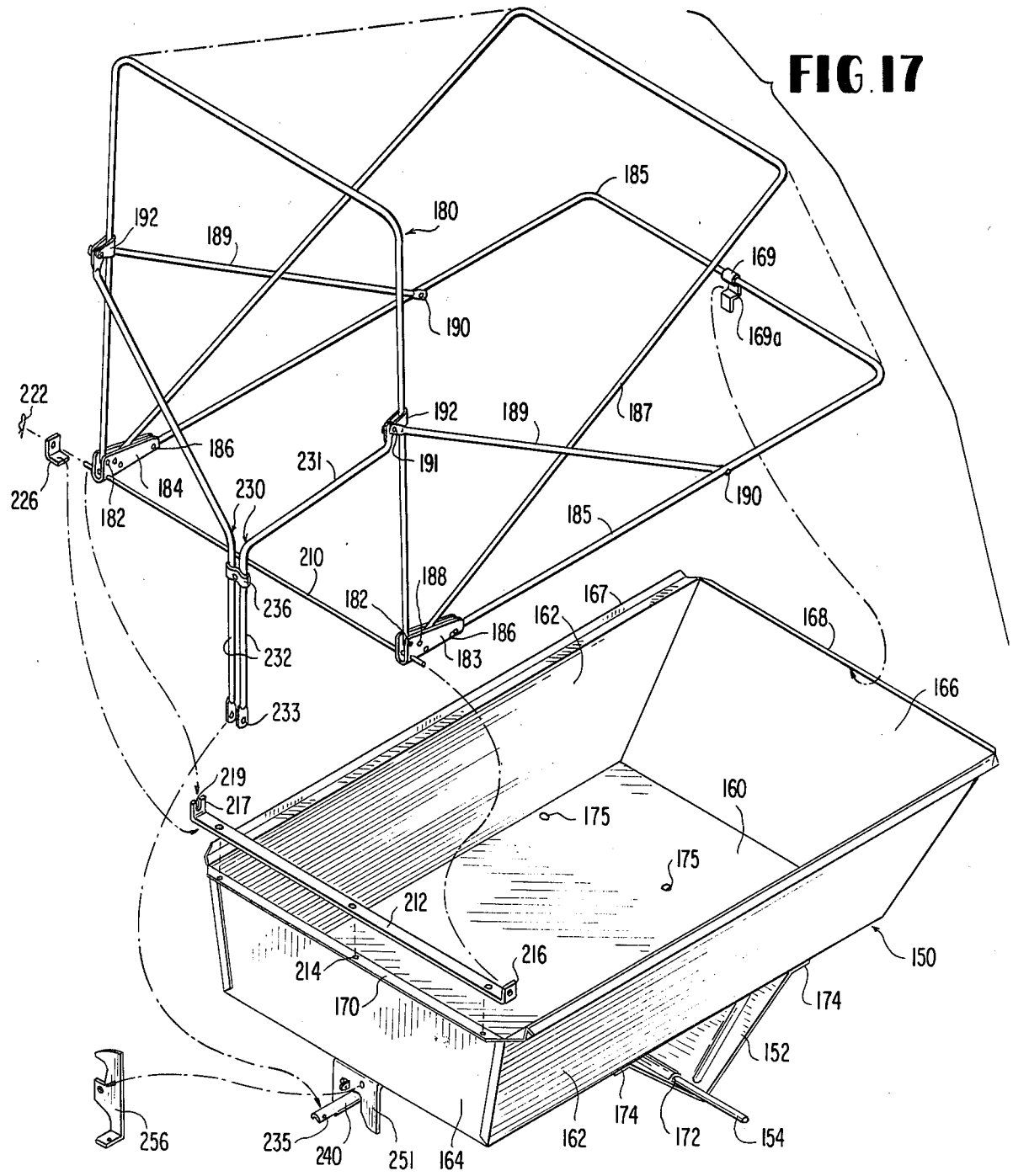

RIDING MOWER WITH GRASS COLLECTING SYSTEM

RELATED PATENTS

The present invention, in certain respects, involves improvements in riding mowers and grass collecting systems described in U.S. Pat. No. 3,716,977, owned by the assignee of the present application.

OBJECTS OF INVENTION

The present invention relates to lawn mowers and grass collecting systems and has particular utility in connection with riding lawn mowers, although certain aspects of the invention need not be limited to riding mowers as they may be applied to "walk-behind" mowers.

A primary object of the present invention is to provide an improved riding lawn mower and associated grass or leaf collecting system having an exceedingly high grass cutting and collecting capacity and yet does not require any auxiliary grass flow inducing devices such as fans, and may be quickly and easily discharged of its harvested contents which may be grass, leaves, and other similar vegetation or matter. Included herein is the provision of such a riding mower and grass collecting system which significantly reduces clogging of the cut grass or other harvested matter in the blade housing or during conveyance to the collection point. Further included herein is such a riding lawn mower and associated grass collecting system which may be successfully operated with increased ground speed and maneuverability without jeopardizing the safety of the operator or bystanding persons or sacrificing the grass cutting and collecting performance.

A further object of the present invention is to provide for a lawn mower, an improved blade housing and cutting blade assembly which will produce an exceedingly high vacuum or suction effect for efficiently picking up and handling grass clippings or leaves and the like with high speed and volume and at moderate noise levels in keeping with present day sound specifications included in standards which have been adopted by industry.

Another object of the present invention is to provide a novel system for harvesting, collecting and dumping grass clippings, leaves and similar matter, including a novel cart assembly which may be hitched to the rear of a riding mower where it will track the same even over relatively steep slopes and difficult terrain without adversely affecting delivery of the harvested material to the cart assembly. Included herein in such a grass collecting cart assembly which may be quickly and easily discharged of its contents while the cart assembly remains hitched to the mower for continued use. Further included herein is the provision of such a cart assembly which includes a cart and a canopy which may be easily removed from the cart to ready the cart for other uses.

Another object of the present invention is to provide an improved riding mower and grass collecting system which may be converted for use in collecting grass clippings, leaves, or other similar matter in a cart assembly hitched to the mower or in a grass collector assembly mounted directly to the mower frame, or for use in discharging grass clippings directly onto the ground without collection.

SUMMARY OF THE INVENTION

According to the present invention, a riding mower is provided with an improved blade housing and cutting blade assembly providing an extremely high vacuum under the blade housing which drives the cut grass, leaves or other matter being collected upwardly and around the top of the blade housing at its periphery to a discharge port located primarily in a front quadrant of the blade housing so that the grass clippings will exit upwardly and rearwardly from the blade housing in a direct straight line path without deviation from the flow path at the discharge port in the housing.

From the discharge port in the blade housing, the grass clippings are conveyed in a straight path to a grass collecting cart assembly hitched to the rear of the riding mower; the assembly including a cart and a canopy covering the cart. This conveyance takes place through an adaptor chute mounted to the blade housing, and a pair of cylindrical chutes, one being coaxially secured to the adaptor chute and the other being movably mounted in the canopy. The chutes are in coaxial, telescoping, movable interrelationship to accommodate any variations in the distance between the cart assembly and mower during operation such as when the mower moves along a curved path. In addition, one of the telescoping chutes is movably mounted in the canopy as noted, and this is achieved through an elbow extension movably mounted in the canopy at one end and fixed to the chute at its opposite end.

In order to discharge the contents of the cart, the canopy is pivoted at its front end to the front end of the cart, and a linkage is provided between a portion of the canopy frame and the cart frame such that when the canopy is pivoted upwardly relative to the cart, the rear of the cart which is mounted on only two wheels will pivot downwardly to allow its contents to flow by gravity downwardly and rearwardly out of the cart. The canopy and its frame may be removed from the cart to permit the cart to be used for other operations such as hauling logs behind the riding mower. During discharge of the contents of the cart, the cart and canopy assembly remain hitched to the riding mower. However, the cart and canopy assembly may be unhitched from the mower and another type of grass collecting assembly may be mounted directly to the rear frame of the mower.

In addition and as will now be described, the riding mower of the present invention may be used to discharge grass clippings laterally into the ground from the blade housing, that is, without collection. In this instance, the cart and canopy assembly are not utilized. The telescoping chutes and the adaptor chute are also removed from the mower. Discharge of the grass clippings from the blade housing takes place through a portion of the discharge port which extends through a peripheral skirt of the blade housing. The latter discharge is further governed by a deflector plate permanently hinged to the deck of the blade housing so as to normally overlie the discharge port, that is, when the chute adaptor is removed from the blade housing. Grass clippings which are conveyed in the upper portion of the blade housing along the deck exit through the discharge port under the guidance of the deflector which is engaged by the grass clippings and which directs them laterally outwardly, downwardly and partly rearwardly of the blade housing. When it is desired to convert the lawn mower for rear discharge and grass collection, the deflector is raised through its hinge mounting and the adaptor chute installed. Preferably, a spacer element is mounted on the adaptor chute to engage the deflector and maintain it spaced from the adaptor chute and telescoping chutes to prevent wear on these parts.

DRAWINGS

It should be understood that the aforementioned description is only a summary of the present invention and that other objects, advantages and features of the invention will become apparent from the detailed descrption below of a preferred embodiment of the invention shown in the attached drawings in which:

FIG. 1 is a perspective view of a riding mower with improved features that may be utilized in accordance with the present invention, the mower being shown in the condition for use in discharging grass clippings laterally onto the ground surface, that is, without collection;

FIG. 2 is a view generally similar to FIG. 1 but showing the mower in the condition for harvesting and collecting grass clippings or other matter, such as leaves, rearwardly through a system which includes a cart with a canopy and chutes also shown in FIG. 2;

FIG. 3 is an enlarged, top plan view of a blade housing included in the riding mower and shown in the condition corresponding to that of FIG. 1 and with portions of the deck of the blade housing broken away to show the cutting blade;

FIG. 4 is a cross-sectional view of the blade housing taken generally along lines 4—4 of FIG. 3;

FIG. 5 is a cross-sectional view taken transversely of the cutting blade of the mower and including an arrow showing the direction of rotation of the cutting blade;

Figure 15:
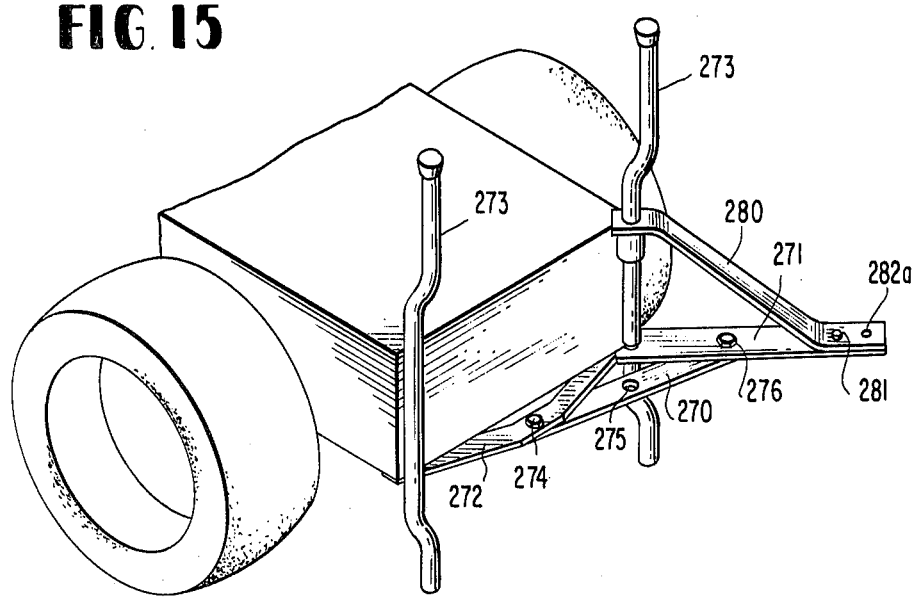
Figure 23:
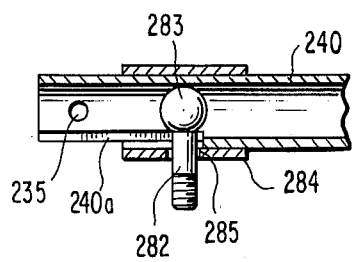
Figure 16:
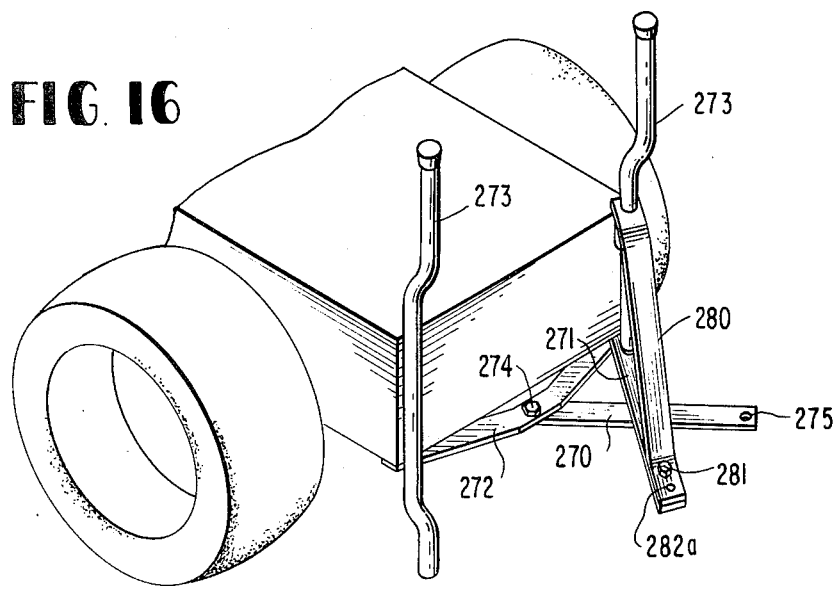
Figure 21:
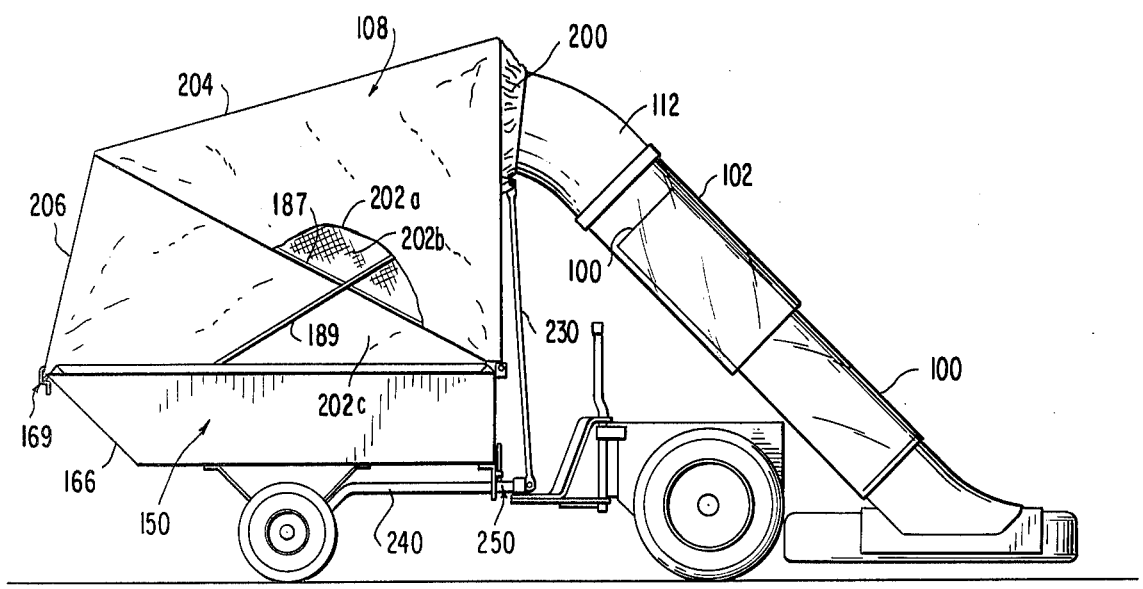
Figure 22:
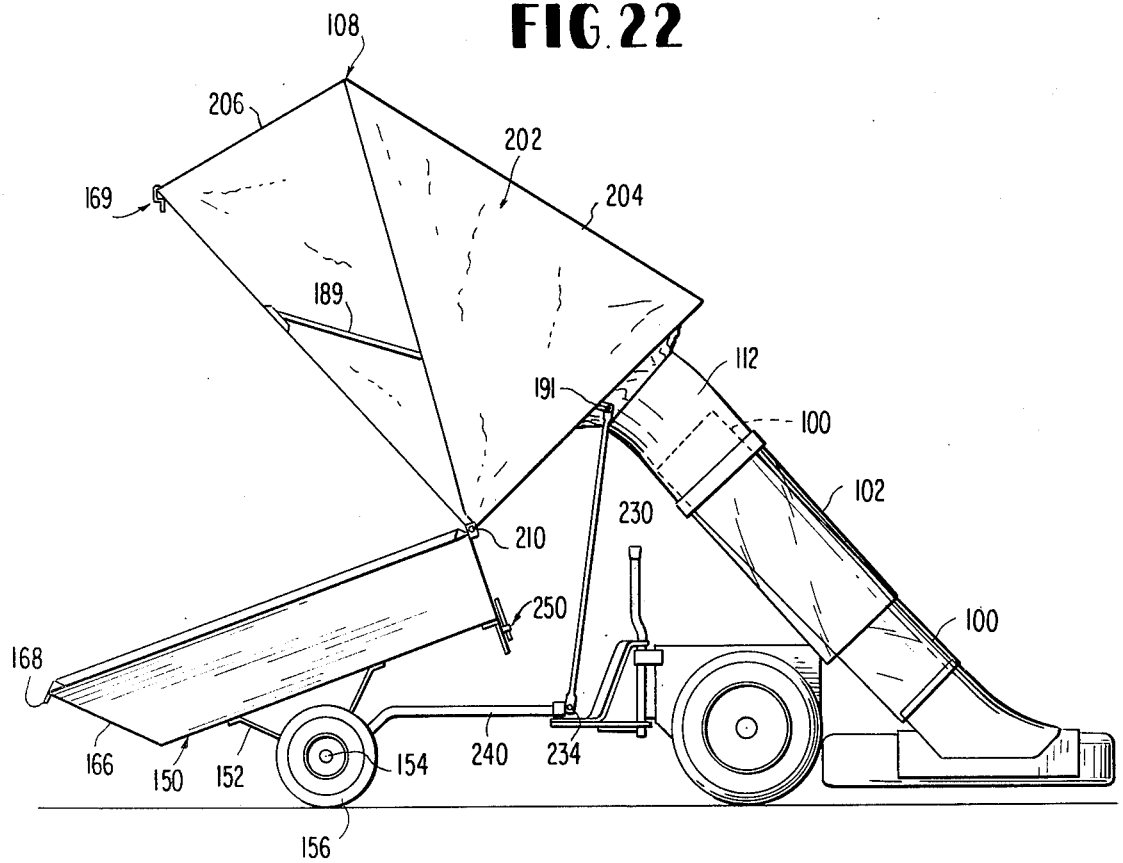

FIG. 6 corresponds to FIG. 3 but is a bottom plan view of the blade housing with portions of the blade housing broken away;

FIG. 7 is a right-hand, side elevational view of the blade housing in the condition corresponding to that of FIG. 1;

FIG. 8 is a cross-sectional view of the blade housing taken generally along lines 8—8 of FIG. 6;

FIG. 9 is a top plan view of the right half section of the blade housing shown with an adaptor chute secured thereto and a portion of a grass conveyance chute which connects to the adaptor chute for discharging grass clippings upwardly and rearwardly into a grass collecting cart or container, not shown;

FIG. 10 is a right-hand, side elevational view of the blade housing including the adaptor chute and the grass conveyance chute shown in FIG. 9 except that in the present view, the grass conveyance chute is assembled;

FIG. 11 is a fragmental, cross-sectional view taken generally along lines 11—11 of FIG. 9;

FIG. 12 is a fragmental, perspective view of a portion of the deck of the blade housing and the adaptor chute illustrating how the adaptor chute is assembled to the blade housing;

FIG. 13 is a transverse cross-sectional view of a grass conveyance chute showing the generally circular cross section and a connecting means utilized in assembling the chute into the cylindrical configuration;

FIG. 14 is an enlarged view of the connecting means of the grass conveyance chute shown in FIG. 13;

FIG. 15 is a fragmental, perspective view of the rear of the mower frame illustrating a hitch assembly utilized to connect the grass collecting cart (not shown) to the lawn mower;

FIG. 16 is a view generally similar to FIG. 15 but showing the hitch assembly in a different position for trailing the grass collecting cart in another position relative to the mower;

FIG. 17 is an exploded, assembly view of portions of the grass collecting cart and canopy frame in perspective and illustrating how the parts are assembled;

FIG. 18 is a fragmental, view taken from the front end of the grass collecting cart and illustrating how the canopy frame is pivotally mounted to the cart;

FIG. 19 is an enlarged, front elevational view of a latch assembly employed to latch the body of the cart relative to the wheel support frame of the cart, the latch assembly being shown in unlatching position freeing the cart body for movement relative to the wheel support frame;

FIG. 20 is a view similar to FIG. 19 but showing the latch assembly in latching position where it secures the cart body relative to the wheel support frame;

FIG. 21 is a side, elevational view of the grass collecting cart shown with its canopy in closed position for collecting grass clippings or other matter upon delivery by conveyance chutes extending from the blade housing of the mower to the canopy;

FIG. 22 is a view generally similar to FIG. 21 but showing the cart and its canopy in an open position with the cart inclined downwardly to the rear for discharging their contents; and FIG. 23 is a cross-sectional view showing a ball hitch assembly for connecting the cart assembly to the mower.

DETAILED DESCRIPTION

The present invention will now be described in detail with reference to a preferred embodiment of the invention disclosed in the drawings. FIGS. 1 and 2 of the drawings disclose a riding mower having front and rear walls 10 and 12 between which there is suspended from the mower frame 14, 14a a blade housing generally designated 16; the suspension being through flexible or collapsible members, preferably chains 18, in accordance with the suspension system shown, for example, in U.S. Pat. No. 3,154,903, assigned to the assignee of the present invention. The riding mower typically includes a motor or engine 19 which drives rear wheels 12 through a transmission system; not shown, and which also drives the cutting blade 20 in rotation from a pulley take-off system also not shown as they form no part of the present invention. Engagement and disengagement of the drive for operating the cutting blade 20 is controlled through a handle 30 while the elevation of the housing 16 and cutting blade 20 may be adjusted through another handle 32. In addition, a third handle 34 is provided for changing the mower ground speed through the transmission, while clutch and brake pedals are shown at 36 and 37 respectively. The speed of the engine 19 is controlled through a throttle lever 38 and, of course, steering is effected through handle bars 39 and a steering column 40 connected to front wheels 10 through steering linkage not shown. The general arrangement of elements described above in this paragraph are believed to be well known and form no part of the present invention and thus require no further description.

BLADE HOUSING 16

Referring now to FIGS. 3 through 8, the blade housing 16 in the preferred embodiment has a circular top wall or deck 42 which is flat and extends in a horizontal plane except for a central depressed portion 44 through which the blade drive shaft 46 extends as best shown in FIG. 4. Portions 42 and 44 of the blade housing deck are connected by an inverted frusto conical portion 47. Blade housing 16 further includes a continuous peripheral cylindrical skirt 50 which depends from, and is integral with, the deck and terminates in a lower peripheral extremity in the form of an inturned lip 52 which aids in producing an upward suction or vacuum effect for lifting rooted grass, grass clippings, leaves and other matter harvested as will be further described. In order to minimize friction and to avoid clogging or irregular flow of the matter being harvested, it is important that the lip 52 extend continuously and uniformly within the skirt for three hundred sixty degrees (360°) with a uniform width and inside diameter concentric with the axis of rotation of the blade. In addition, the juncture between the skirt 50 and lip 52 should be smoothly arcuate or curved to avoid sharp corners which would otherwise allow harvested material to collect and impede flow of material and movement of the cutting blade. To achieve the aforementioned objectives, it is important that lip 52 be formed integral with the skirt 56 such as may be effected through means of a rolling process. In this way, not only are the above operational advantages achieved but also it strengthens the lip structurally while also reducing scrap material and labor.

Discharge of grass clippings or other matter being harvested from blade housing 16 is effected through a discharge port generally designated 54 primarily located in the upper right-hand quadrant of the blade housing as best shown in FIGS. 3 and 6. The discharge port is elongated in the forward-rearward direction of the mower travel and extends along the skirt for approximately sixty degrees (60°) which includes approximately forty degrees (40°) in the right-hand quadrant and approximately twenty degrees (20°) in the rearward right-hand quadrant. Referring to FIG. 3, a certain portion 54a of the inside edge of discharge port 54 extends a certain distance along a straight line parallel to the front rear axis of the housing and merges with a peaked front edge portion 54b of the port and a wider rear edge portion 54c which is reversely curved relative to peaked portion 54b with greater radii of curvature; the curves being generally parabolic. Since the rear portion 54c (FIG. 3) of discharge opening 54 is larger than its front portion 54b, the configuration of discharge opening may therefore be described as being generally oblong or egg-shaped. As best shown in FIG. 6, the discharge port 54 also extends through a portion of the skirt 50 which is slotted along the line 50a to an elevation below the deck 42.

Referring now to FIGS. 3 to 6, cutting blade 20 has cutting edges 21 formed on opposite sides thereof at its extremities in conventional fashion. In addition, portions 22 of the blade on the side opposite cutting edges 21 are bent upwardly at an angle x (see FIG. 5) preferably forty-five degrees (45°) to receive air impellers 23 which are bolted at 24 to blade portions 22 for producing a vacuum or suction for picking up grass clippings or leaves during a cutting or harvesting operation. Air impellers 23 include horizontal triangular portions 23a which project rearwardly from blade 20, and upstanding portions 23b which are bent upwardly from the triangular portions 23a at an angle y (see FIG. 5) preferably sixty degrees (60°) to cause some of the air impelled air to be directed upwardly in the region R (see FIG. 4) at the periheral corner between the deck 42 and the skirt 50. Impeller portions 23b also extend outwardly at a rearward rake at an angle z (see FIG. 3) between twenty degrees (20°) and forty degrees (40°) but preferably thirty degrees (30°) from their junction with blade 20 towards the housing skirt 50 to optimize the amount of air to be impelled outwardly against skirt 50 to thus provide, in conjunction with the inturned lip 52, an exceedingly high vacuum flow path in the housing region R which vacuum is contained by the deck and skirt including the inturned lip 52. This vacuum will cause the harvested grass, leaves, etc., to be sucked upwardly and outwardly above the blade cutting edges 21 and the impellers 23 against the deck 42 and the skirt 50 in the corner region R (see FIG. 4) as they travel about in a circular path until reaching discharge port 54 where they exit without changing direction. The depth of skirt 50 and the mounting of blade 20 at the bottom of the blade housing are designed accordingly to provide sufficient space of at least two inches in the region R above the cutting edges and impellers of the blade (as shown in FIG. 4) to receive the harvested matter as indicated. Further, as indicated above, the skirt 50 is formed integral with the deck 42 along a smoothly curved juncture therebetween which provides a guide surface facilitating flow of the harvested material while avoiding sharp corners which can collect material and impede the flow of the material being harvested.

In addition, in the preferred embodiment shown, the length of cutting blade 20 is such that its opposite extremities closely overlie the inturned lip 52 of the blade housing and project slightly beyond the extremity of the lip 52. In one preferred embodiment where the blade housing has an outside diameter of about twenty-nine inches (29") and the skirt has a depth of about four and three quarters inches (4¾"), the depth of the space between the deck 42 and the upper extremities of the impeller portions 23b is about three inches (3") while the inturned lip 52 extends about three quarters of an inch (¾") from skirt 52 with a thickness which may be as low as 0.074" enabled by the integral formation of the rolling process which integral formation strengthens the lip. In addition, the overall length of the discharge opening 54 in the forward-rearward direction of the mower is about fourteen and three quarters inches (14¾") and the width at its widest point is about six inches (6"). The depth of the discharge opening in the skirt 50 is about two inches (2"). The vertical distance between the cutting blade edges 21 and the lip 52 may range from three sixteenths of an inch (3/16") to three eighths of an inch (⅜") while the amount of horizontal overlap of the cutting blade over the lip 52 may range from one eighth of an inch (⅛") to one quarter of an inch (¼").

BAFFLE 60

In order to guide the harvested matter along the circular path of the blade housing 16 and through the discharge port 54, a baffle is provided in the blade housing. This baffle includes a strip 60 such as may be made from sheet steel or other suitable material, having a generally "S" or serpentine shape fixed to the underside of housing deck 42 by any suitable means such as mounting tabs 62 and 62a projecting from the baffle strip in a horizontal plane and fixed to the deck by bolts 63, as best shown in FIGS. 6 and 8. Referring to FIG. 6, in the direction of blade rotation, baffle strip 60 starts at 64 in the longitudinal center line of the mower and runs along an arc having the same direction of curvature as skirt 50 until it reaches discharge port 54 at which area, the mounting tab portion 62a reverses its curvature while moving along the rear edge 54c (see FIG. 3 also) of the discharge port 54 and terminating in a reversely curved portion 64 which avoids entrapment and collection of grass clippings between the baffle and skirt 50. As shown in FIG. 7, the extremity portion 65 of the baffle terminates at 65a at the outside surface of the skirt 50. This avoids the formation of cracks or spaces between the baffle and the inside surface of the skirt 50 which could otherwise collect the harvested material and impede the flow of material. Preferably, the edge portion 50a is provided with a recess at 50b receiving the extremity portion 65a of the baffle so that a smooth transition from the baffle to the skirt edge 50 is provided.

As shown in FIG. 8, baffle strip 60 projects downwardly from mounting tab 62 at a guide portion 66 which is inclined in the direction of discharge port 54 to define a guide surface for guiding grass clippings or other harvested matter upwardly through discharge port 54. At the lower portion of guide surface 66, the baffle strip reverses and projects horizontally under itself to form a flange 67 as shown in FIGS. 6 and 8. Baffle strip 60 is constructed with its guide portion 66 and flange 67 formed integral with each other at a curved juncture 68 as best shown in FIG. 8 so that no sharp edges are presented to the grass clippings being harvested which would otherwise adhere themselves and eventually clog the discharge path as is quite common in conventional lawn mowers. In order to maximize performance during operation, it has been discovered that the distance between the lowermost point of the baffle, i.e., the flange 67 and the top of the impellers 23 must be limited so that it does not exceed one half of an inch ($\frac{1}{2}''$). This distance may be in the range of one quarter of an inch ($\frac{1}{4}''$) to one half of an inch ($\frac{1}{2}''$) in the preferred embodiment.

DEFLECTOR 70

Referring to FIGS. 1, 6 and 7, a deflector generally designated 70 is provided to overlie the discharge port 54 and project laterally and rearwardly from the blade housing to guide grass clippings out of the housing and onto the ground surface in those situations when it is not desired to collect the clippings as will be described below. Baffle 70 is preferably made from sheet steel and has an inverted dish-shaped top portion 72 adapted and dimensioned to overlie discharge port 54 at an elevation slightl above that of the housing deck; and a side portion 74 depending from top portion 72 and running along a tangent line from the periphery of the blade housing as best shown in FIG. 6. As skirt 50 is slotted for a portion of its depth at 50a as described above, deflector plate 70 will define with edge portion 50a a discharge port 54, as best seen in FIG. 7.

It is preferred that deflector 70 be permanently mounted to the blade housing and this is accomplished in the preferred embodiment by a hinge connection formed by a flat mounting portion 75 of deflector 70 which portion 75 is provided with hinge barrels 76 for coaxial registry with barrels 77 formed in a mounting plate 78 that is bolted at 79 to deck 42 of the blade housing. Provided in barrels 76 and 77 is a hinge pin 80; and a strong torsion spring 81 is provided about hinge pin 80 to urge deflector plate 70 towards closed position covering discharge port 54 as shown in FIGS. 1, 3 and 6. In the preferred embodiment shown, and with reference to FIGS. 3 and 6, a right angle reinforcement channel member 82 is fixed by bolts 83 to the top of housing deck 42 to extend in the forward-rearward direction of the blade housing. Mounting plate 78 is secured on the horizontal leg of channel 82. A similar reinforcement channel 82a is fixed to the other side of the mower housing deck as shown in FIG. 3.

Although torsion spring 81 imposes a strong force maintaining deflector 70 closed, in order to prevent accidental movement of deflector 70 which may open discharge port 54 when the mower is in use, a latch is provided on deflector 70 and skirt 50 of the blade housing. In the preferred embodiment, the latch includes a stop 85 fixed to skirt 50 to be received in a recessed portion 86 formed in side wall 74 of deflector 70 as best shown in FIG. 7. The stop is fixed to skirt 50 through means of a bolt (not shown) received through an elongated slot formed in the stop; the slot permitting the position of the stop to be adjusted precisely so as to be received in the recess 86 of the deflector with the desired fit. Because the deflector plate 70 is pivoted and moves along an arc into closed position, stop 85 will be engaged in recess 86 so that any excessive upward vertical forces imposed on the deflector during use of the mower will not be effective to raise deflector 70 to open discharge port 54. If it is desired to raise the deflector when converting the mower for rear discharge and collection of the grass clippings as will be described, the stop may be loosened through its mounting bolt or, depending on the fit of the stop in the recess 86, side wall 74 of deflector 70 may be pulled outwardly with a lateral force which will enable deflector 70 to be raised without impairment from the stop.

ADAPTOR CHUTE 90

Referring now to FIGS. 2, 9 and 10, to convert the mower for use in collecting grass clippings, leaves, etc., deflector plate 70 is raised gainst the bias of spring 81, and an adaptor chute 90 is installed on the blade housing deck 42 to overlie discharge port 54 and form a natural extension of the flow path of the grass clippings emerging from discharge port 54 so that they are conveyed at an upward and rearward incline in a straight path without deviation. Although deflector 70 is preferably formed from plate steel or a suitable alloy, the adaptor chute 90 may be formed from molded plastic of rugged, durable quality. Adaptor chute 90 includes a horizontal mounting portion 92 dimensioned to overlie housing deck 42 above discharge port 54; and a vertical skirt or flange portion 94 adapted and dimensioned to cover blade housing skirt 50 at the region of slot 50a (FIG. 7) formed in skirt 50 as described above. To this extent, adaptor chute 90 is similar to the chute 72 disclosed in U.S. Pat. No. 3,568,421, assigned to the assignee of the present invention. Adaptor chute 90 further includes a conduit portion 95 which, when the adaptor is installed, projects upwardly and rearwardly from discharge port 54 with which it forms a continuation at the inlet end of adaptor chute 90.

Mounting and securement of adaptor chute 90 to the blade housing is achieved through a plurality of elongated raised mounting lugs, there being two shown in FIG. 12, formed in the horizontal mounting portion 92 of adaptor chute 90; the lugs 96 being formed integral with the adaptor chute body in the preferred embodiment. Lugs 96 are dimensioned to be received in a pair of similarly contoured sockets 97 formed on horizontal plate 78. As shown in FIG. 12, lugs 96 are axially inserted in the sockets 97 with the edge portion 92a of horizontal mounting portion 92 of adaptor chute 90, passing beneath free extremities 97a of sockets 97 which are spaced above the blade housing deck 42, as best shown in FIG. 11. In addition and although not shown, it is preferred that the vertical skirt portion 94 of adaptor chute 90 be bolted to skirt 50 of the blade housing to further secure the adaptor chute to the blade housing. Lugs 96 not only secure the adaptor chute in position but also serve to properly locate the adaptor chute relative to discharge port 54, so that chute conduit 95 forms a straight continuation of discharge port 54.

CHUTE SYSTEM

When it is desired to collect the grass clippings or leaves, etc., rather than discharging them onto the ground through use of deflector 70, a novel chute and collection system is employed in conjunction witht he riding mower as shown in FIGS. 2, 21 and 22. This sytem includes a plurality of cylindrical chutes 100 and 102 which are coaxially arranged in telescoping movable interrelationship between adaptor chute 90 and a cart assembly, generally designed 104 in FIG. 2, into which the grass clippings or leaves are collected. As will be further described, the cart assembly includes a body generally designated 106 (see FIG. 2), having an open top adapted to be covered by a canopy generally designated 108 which, in turn, includes a flexible front wall with an inlet opening 110 for receiving an elbow chute 112 included in the chute system.

Elbow chute 112 has one end movably mounted in the inlet opening 110 of the canopy 108 and an opposite end fixed to chute 102 in coaxial reltionship so as to form an extension of chute 102. Any suitable means may be utilized for securing chute 102 to elbow chute 112, such as nuts and screws extending through apertures formed in these chutes. Further, elbow chute 112 is provided with a flanged mouth 113 for receiving chute 102 as best shown in FIG. 2. Any suitable means may be utilized to mount elbow chute 112 in the inlet opening 110 of the canopy but in the preferred embodiment, an elastic drawstring is provided in the canopy material about inlet opening 110 to maintain a snug fit of the canopy about elbow chute 112 for sealing purposes while permitting rotation of the elbow chute about its own axis as well as longitudinal or transverse rectilinear movement or angular movement of the elbow chute relative to the canopy and vice versa about vertical and horizontal axis. The latter movement, together with the relative longitudinal movement of chutes 100 and 102 permitted by their telecoping interrelationship, permits the cart to track the chute system during excursions of the cart when the mower is in use. As shown in FIGS. 21 and 22, the relative movement of these parts also accommodates movement of the cart canopy during a discharge operation to be subsequently described. Although not shown, the outlet end of elbow chute 112 located in the canopy 108 is provided with a radially outwardly projecting flange which, together with the elastic drawstring, will maintain the elbow chute in the inlet opening 110 of the canopy.

It is preferred that chutes 100, 102 be made from transparent plastic material having a generally cylindrical cross section as shown in FIG. 13. Due to the telescoping relationship of chutes 100, 102, the diameter of chute 100 is slightly less than the diameter of chute 102. Moreover, it is important that the diameter of the lower or upstream chute 100 be less than that of the upper or downstream chute 102 rather than the opposite condition, so as not to impede the flow of the harvested material when passing from the lower chute 100 to the upper chute 102.

In the preferred embodiment, chutes 100 and 102 are made from rectangular, transparent plastic sheet stock which is fabricated into the desired cylindrical configuration by deflecting the sheet to bring its opposite edges into engagement where they are suitably fstened along a longitudinal seam to provide the desired cylindrical shape. In the specific embodiment shown, a tongue and groove fastening means is provided for fastening the opposite edges of the sheet stock. Referring to FIGS. 2, 13 and 14, it includes a tongue strip generally designated 116 having a mounting groove 118 extending throughout its length and receiving one of the side edges of the chute to which the strip is suitably permanently attached such as by bonding. Tongue strip 116 further incudes a tongue including an arrow-like head portion 120 and a neck portion 122 defining with the head portion, a shoulder 123, as shown in FIG. 14.

The opposite side edge of the same chute includes a groove strip 126 having a mounting groove 127 receiving the side edge of the chute to which it is permanently attached, such as by bonding. Groove strip 126 further includes fastening groove 128 dimensioned to receive the head and neck portions 120, 122 of the tongue element, as shown in FIG. 14. Fastening groove 128 has portions shaped complementary to portions of head 120 and neck 122 of the tongue element. Due to this shaping and the relative dimensions between the tongue and groove strips 116, 126, during fabrication once the tongue strip 116 is inserted into the groove strip 126 and the groove strip is applied with pressure on its opposite sides to ensure proper interlock of shoulder portions 123, the opposite edges of the chute will become fastened with the cute assuming the cross-sectional shape shown in FIG. 13. The tendency of the sheet stock to return to its natural flat shape will only serve to increase the interlock of the tongue and groove strips 116, 126. It will be appreciated that instead of the specific interlocking elements 120 and 128, other interlocking elements of different shapes may also be employed. Moreover, although an interlocking fastening means has been shown and described, it should be understood that any other suitable type of fastening means may be employed. Although not shown, one such means may include nuts and screws placed through preformed apertures in overlapping edge portions of the chutes at longitudinally spaced locations along the chute. Any other suitable means may also be employed. In addition, preformed cylindrical chutes requiring no shaping or fastening may of course be employed.

Referring now to FIGS. 2, 9, 10 and 11, the chute system is mounted relative to the blade housing of the mower through means of the lower chute 100 which is dimensioned to be received about the outlet 95 of adaptor chute 90 so as to form a straight continuation of the latter. It is preferred that the lower chute 100 be positively secured relative to adaptor chute 90; and in the shown embodiment this is accomplished through means of a tongue 130 in the form of a rigid bar fixed to the wall of chute 100 to project from the lower or inlet end thereof to be received under a catch 132 fixed to the outer wall of adaptor chute 90. It is preferred that tongue 130 be fixed to chute 100 by nuts and screws 134 which also serve to secure a handle 136 to lower chute 100 over a portion of tongue 130, as best shown in FIG. 10. Further, it is preferred that a reinforcement plate 137 be secured to the interior wall of chute 100 below handle 136 and tongue 130.

Referring to FIG. 11, catch 132 includes a mounting portion 138 fixed to adaptor chute 90 such as by a bolt and nut assembly 139; and a catch portion 140 raised from the surface of adaptor chute 90 to define a space for receiving tongue 130. Tongue 130 fits snugly under catch portion 140 which has a springlike quality that urges tongue 130 downwardly into engagement with adaptor chute 90. Moreover, the extremity 142 of catch portion 140 projects downwardly to prevent rotational movement of chute 100 about adaptor chute 90. Axial withdrwal of chute 100 from the adaptor chute 90 is prevented by press of catch portion 140 and also by the extremity 131 of tongue 130 which is raised, as best shown in FIG. 10, so as to be engageable with catch portion 140. In order to remove lower chute 100 from the adaptor chute 90, handle 136 is grasped and chute 100 is rotated counterclockwise (as viewed in FIG. 11) against the bias of catch portion 140 to laterally withdraw tongue 130 from catch portion 140. Securement of chute 100 relative to adaptor chute 90 is obtained by placing chute 100 about the mouth of the adaptor chute 90 and rotating chute 100 in a clockwise direction (as viewed in FIG. 11) until tongue 130 is received under catch portion 140. The extremity of catch portion 140 is flared at 142a to facilitate entry of the tongue into the catch.

As noted above, deflector 72 is permanently hinged to the blade housing of the mower so that when it is desired to install the chute system for collection of grass clippings with the cart assembly 108, deflector 72 may be raised into the position shown in FIGS. 2 and 11. In order to space deflector 72 from adaptor chute 90 and lower chute 100, it is preferred that a spacer element be provided between these members. In the preferred form shown, a metallic spacer in the form of a generally inverteed V-shaped strut 144 is fixed to the adaptor chute 90 by nut and bolt assemblies 139 and 139a. The spacer 144 is dimensioned so that its top portion 145 will engage deflector blade 72 as best shown in FIG. 11 to maintain it spaced from the adaptor chute 90 and lower chute 100 to prevent wear on these parts during operation. The spacing also facilitates assembly and disassembly of chute 100 relative to adaptor chute 90. Also, in the preferred embodiment shown, one of the feet 147 of spacer 144 is mounted over the mounting portion 138 of catch 132 and secured relative to the adator chute 90 by the same nut and bolt assembly 139 employed to secure catch 132 relative to adaptor chute 90.

CART ASSEMBLY

Referring to FIGS. 2 and 17, the cart assembly basically includes a body generally designated 150 having an open top, a canopy generally designated 108 mounted on the body, an axle support frame 152 fixed to the underside of the body and receiving an axle 154 on the opposite ends of which are mounted the wheels 156 of the cart.

As best shown in FIG. 17, cart body 150 includes a base 160 having a generally rectangular shape in the specific embodiment opposite side walls 162 upstanding from the base and extending outwardly at a slight angle; a front wall 164 extending upwardly from the base and interconnecting front portions of the side walls 162; and a rear wall 166 extending upwardly and outwardly at an angle from the base 160 and interconnecting the rear portions of side walls 162. The cart body may be made from any suitable material such as sheet steel. Further in the preferred embodiment shown, the body side walls 162 are provided with elongated flanges 167 projecting outwardly and then upwardly from their top edges to define elongated L-shaped seats for receiving the lower end of canopy 108 as will be further described. Rear wall 166 of the cart body is provided with a top flane 168 projecting outwardly and downwardly (see FIG. 22) to provide a ledge under which a catch generally designated 169 may be releasably fastened to secure the canopy 108 in closed position over the cart body 150 as will be further explained below. An elongated horizontal flange 170 is also formed along the top of the front wall 164 of the cart body to receive mounting structure for pivotally mounting the canopy 108 to the body as will be described below.

Axle support frame 152, in the specific embodiment, includes a generally V-shaped structure made from sheet steel, for example, and including opposite and downwardly converging side walls which at their bottom ends define elongated passages 172 for receiving axle 154 as best shown in FIG. 17. Axle support frame 152 further includes upper mounting flanges 174 projecting outwardly from its side walls and fixed to the base 160 of the cart body in any suitable manner such as by nuts and bolts passing through apertures 175 formed in mounting flanges 174 and in the base 160 of the cart body. Cart wheels 156 are mounted to the opposite ends of axles 154 in any suitable conventional manner.

Axle support frame 152 is positioned so that cart wheels 156 are located generally at the mid point between the opposite front and rear extremities of the cart body 150. As will become clearer, this enables pivoting of the cart body 150 about axle 154 for discharging the contents of the cart as illustrated in FIG. 22. For this latter purpose, rear wall 166 of the cart body is made to extend at an incline upwardly from base 160 of the body so as to permit the cart body to be pivoted rearwardly and downwardly a sufficient distance to facilitate discharge of the contents by gravity from the rear end of the cart.

Canopy 108 includes a frame comprised of frame rods, and a cover of suitable sheet material such as nylon mounted on the frame rods. Referring to FIG. 17, the canopy frame includes a front frame member 180 in the form of an inverted U-shaped hollow metallic rod, the lower ends of which are pivoted by pins 182 in corner brackets, shown as being elongated sheet steel channels 183, 184 each defining a passage receiving the ends of the front frame member 180. The canopy frame further includes a base frame member 185 also having a U-shaped configuration corresponding to the outline of the top of the frame body 150 with its extremities being received in the passages of corner brackets 183, 184 in which they are fixed by pins 186. In addition, the canopy frame includes a center frame member 187 also having a generally U-shaped configuration, the extremities of which are also received in corner brackets 183, 184 and pivoted therein by pivot pins 188. The canopy frame further includes reinforcement struts in the form of straight rods 189 having lower ends pivoted by pins 190 in the sides of the frame base members 185 intermediate the ends of the latter. The upper ends of struts 189 are fixed by pins 191 to U-shaped brackets 192, the bases of which are fixed such as by screws about the vertical portions of front frame members 180 in the position shown in FIG. 17.

Referring to FIGS. 2, 21 and 22, the covering material of the canopy includes a front wall 200 as shown as having a generally rectangular shape, and peripheral portions of which are provided with elongated pockets for receiving the front frame member 180 of the canopy frame. Canopy front wall 200 is dimensioned to provide a certain predetermined amount of slack in its upper region about inlet port 110 (as best shown in FIGS. 21 and 22) to facilitate movement of the canopy and cart relative to the chute 112 and vice versa in horizontal, vertical and inclined planes during use. In the preferred embodiment, the canopy covering material is made from a suitable flexible sheet choth or canvas or plastic or any combination of such materials. However, as long as the front wall 200 is made from flexible material or is provided with a flexible joint between it and the elbow chute 112 to permit the various degrees of movement as described above, the canopy covering material may be made from rigid of relatively rigid sheet material.

The canopy covering material further includes opposite side walls 202 and top and rear walls 204 and 206 interconnecting the side walls 202, with the top wall 204 extending downwardly at a slight incline from front wall 200 to rear wall 206 which extends downwardly and slightly rearwardly at an incline from top wall 204. It should be understood that the adjoining margins of the various walls of the canopy covering are interconnected so as to form one piece which may be spread and assembled to cover the canopy frame and define an enclosure when the latter is assembled into the position shown in FIG. 17. For assembly purposes, the bottom marginal edges of side walls 202 and rear wall 206 of the canopy covering material are provided with pockets (not shown) for receiving the base frame member 185. Similarly, intermediate portions of the canopy side walls 202 in the interior thereof are provided with elongated pockets (not shown) for receiving the center frame member 187 of the canopy.

Referring to FIG. 21, the upper triangular section of each side wall 202 of the canopy covering material is comprised of two sheet layers including an outer layer 202a and an inner layer 202b which is made from a foraminous mesh for facilitating air flow. Mesh layer 202b is connected to the lower triangular section 202c of side wall 202 to form one piece while outer layer 202a is separated from mesh layer 202b so that air may exit from the canopy along the diagonal line between the upper and lower triangular sections corresponding to the location of the center frame member 187 of the canopy frame. Reinforcement struts 189 of the canopy frame pass in the spaces between the layers 202a and 202b as best shown in FIG. 21.

In assembling the canopy, the canopy frame members 180, 185 and 187 are first inserted in the pockets of the canopy covering material and then the extremities of the canopy frame members are pivotally connected to the corner brackets 183, 184 as described. For mounting the assembly to the front of the cart body, a hinge rod 210 is inserted between the extremities of the front and base frame members 180, 185 by means of apertures provided in the corner brackets 183, 184 as best shown in FIGS. 17 and 18. Hinge rod 210 is then mounted to the cart body by means of a hinge mounting bar 212 which is fastened such as by bolts passing through apertures 214 in the top flange 170 of the front wall 164 of the cart body. Hinge mounting bar 212 has, at its opposite ends, upstanding ears 216, 217; one ear 216 being provided with an aperture for receiving one end of hinge rod 210 and the other ear 217 being provided with a U-shaped slot 219 for receiving the other end of the hinge mounting bar 212 with the corner mounting brackets 183, 184 being located inwardly of upstanding ears 216 and 217 as best shown in FIGS. 17 and 18. A split pin 220 is provided through an aperture in one end of hinge rod 210 to prevent withdrawal from ear 216 of the hinge mounting bar. A split pin 222 is also provided through an aperture in the other end of the hinge rod 210; and preferably, a right angle stop 226 is provided about the hinge rod 210 outwardly of the mounting ear 217 to be engageable with the underside of flange 170 of the front wall of the cart body to prevent upward movement of hinge bar 210 out of the U-shaped slot 219 of mounting ear 217 as shown in FIG. 18.

In order to assemble the canopy and frame to the cart body, the hinge rod 210 is first inserted through the ear 216 of the hinge bar 212 and then the opposite end of the hinge rod is lowered through U-shaped slot 219 in the mounting ear 217 after which right angle stop member 226 is inserted on the extremity of the hinge rod and then split pins 220 and 222 are inserted in the hinge rod to complete the assembly. Thus mounted, the entire canopy is pivotable about hinge rod 210 between a closed position in which the base of the canopy as defined by the base frame member 185 rests in the seat provided by the flange 167 of the body side walls, and a raised or open position where the canopy has been pivoted upwardly about the hinge rod 210, in a position such as shown in FIG. 22, for discharging the contents of the cart.

For discharge of the contents of the cart, the canopy is pivoted upwardly about the front end of the cart as just described. In addition, the cart body itself is pivoted downwardly about the wheel axle 154 into the position generally shown in FIG. 22. The latter movement of the cart body is achieved through a linkage which includes the cart body, the canopy covering frame and a pair of struts 230 having upper ends pivoted at 191 between walls of brackets 192 as best shown in FIG. 17. The same pivots 191 employed for mounting diagonal struts 189 may be employed for mounting struts 230 to brackets 192 with struts 230 being received between the bracket walls and with the diagonal struts 189 being received on the outside of the bracket walls. From their pivotal connections to brackets 192, struts 230 converge inwardly at 231 towards each other at the center of the cart where they then extend at 232 in straight lines parallel to each other so that struts 230 together form a generally Y-shaped configuration best shown in FIG. 17. The lower ends of struts 230 are provided with apertures 233 for receiving a pivot pin 234 (see FIG. 22) which mounts them for pivotal movement to a tongue bar 240 which is fixed at one end to the wheel axle 154 and extends under the longitudinal center line of the front portion of the cart body and projects beyond the front wall 164 of the cart body, as best shown in FIGS. 17, 21 and 22. Tongue bar 240 which is preferably made from tubular metallic stock is provided at its outer extremity with apertures 235 for receiving the pivot 234 for pivotally mounting the lower ends of struts 230 relative to the tongue bar. To maintain the proper relative position of struts 230, a pair of clamp plates 236 are provided on opposite sides of the struts and held together by means of a nut and bolt assembly extending through the centers of the clamp plates 236 as best shown in FIG. 17.

With reference to FIGS. 21 and 22, it will be seen that when the canopy 108 is raised relative to the cart body 150 this will have the effect of pivoting struts 230 in a clockwise direction forwardly about pivot pin 234 relative to tongue bar 240 and this will cause the cart body 150 to pivot rearwardly about wheel axle 154 in a counterclockwise direction, the latter occuring while canopy 108 is moving in a clockwise direction about hinge rod 210. During this movement, canopy 108 moves forwardly as shown in FIG. 22, and this is permitted by the telescoping relation between chutes 100 and 102 and the fact that the elbow chute 112 is not positively attached to the front wall of the canopy so as to permit the canopy to move forwardly relative to and along elbow chute 112. Continued movement of the canopy in the clockwise direction from the position shown in FIG. 22 would cause continued pivoting of cart body 150 in the counterclockwise direction until rear wall 166 of the cart body engages the ground surface. As can readily be seen, this places the cart body in an ideal steep incline for discharge of its contents by gravity. Furthermore, the raising of canopy 108 when pivoting to the discharge position facilitates the flow of grass clippings or leaves the top portions of the canopy downwardly to the cart body from where they discharge rearwardly beyond rear wall 166 of the cart body; it being understood that grass clippings or leaves can be collected in the cart body and in the canopy to the uppermost level of the canopy adjacent its top wall 204.

When canopy 108 is in the closed position covering cart body 150 as shown in FIGS. 2 and 21, the weight of these parts plus the orientation of struts 230 will prevent pivoting of the cart body about wheel axle 154. However, in order to positively secure the cart body relative to tongue 240 when the cart is being used for hauling without the canopy, a latch mechanism, generally designated 205, is preferably provided. Referring to FIGS. 17, 19 and 20, latch mechanism 205 in the form shown includes a latch mounting plate 251 including a flange 252 suitably fixed, such as by nuts and bolts to the underside of the cart body base 160 at the front wall 164 of the cart body. Latch mounting plate 251 includes a slot 253 opening into the lower edge portion thereof and having a generally inverted V-shaped configuration merging into a circular shape at 254 for receiving tongue bar 240 as best shown in FIGS. 19 and 20. A latch plate generally designated 256 is pivotally mounted through pivot 256 on the front surface of latch mounting plate 251 to be movable between a latching position in which its latching slot 258 receives tongue bar 240 as shown in FIG. 20 to prevent separation of cart body 150 and tongue bar 240; and an unlatching position shown in FIG. 19 freeing tongue bar 204 to permit the cart body to be pivoted relative to the tongue bar for discharge.

Preferably, a spring biasing mechanism is provided for urging latch plate 256 in either of its open or closed positions. Spring mechanism including a tension spring 259 having one end anchored in a slot formed in an ear 260 fixed to the latch plate 256 and an opposite end received in a slot formed in a tab 261 projecting from the latch mounting plate 251. It will be seen that since tension spring 259 applies a force to latch plate 256 in a direction offset from the axis of pivot 257 of the latch plate 256, the tension spring will impose a bias tending to keep the latch plate closed when the latter is in the closed position shown in FIG. 20. Since tension spring 259 is also offset from pivot 257 when latch plate 256 is in the open position shown in FIG. 20, the spring force will act in a direction to keep latch plate 256 in this open position.

It is also preferred that a catch be provided for releasably securing canopy 108 to cart body 150 in the closed position of the canopy shown in FIGS. 2 and 21. Such a catch as shown in FIGS. 17 and 22, may include a metallic strap 169 having a barrel mounted about a cross piece of base frame mounting member 185 and a step-shaped portion 169a depending from the barrel to define a recess for receipt about flange 168 on rear wall 166 of cart body 150. Strap 169 is dimensioned so that when placed about flange 168 it will prevent separation of the canopy 108 from the cart body. However, in order to raise the canopy for discharge or for disassembly, the lower portion of strap 169 is grasped and the strap is pivoted outwardly and upwardly about the cross piece of the canopy base frame member 185 to release flange 168.

HITCH ASSEMBLY

Referring to FIGS. 15 and 16, the cart assembly is connected through means of the tongue bar 240 to the rear of the riding mower frame by means of a hitch assembly which, in the preferred embodiment, includes two lower draw bars 270 and 271. Draw bar 270 is mounted at one end to a horizontal rear frame member 272 of the mower at the longitudinal center line of the mower while draw bar 271 is mounted at one end about a vertical post 273 fixed to the rear end of the mower frame, the latter mounting being effected through means of an aperture in draw bar 371 receiving post 273. The mounting of draw bar 270 to frame member 272 may be effected by a nut and bolt 274 received through apertures in draw bar 270 and frame member 272. Draw bar 270 is additionally provided with a plurality of apertures 275 spaced along the length thereof for receiving a fastener, such as bolt 276 for securing draw bars 270 and 271 relative to each other in a desired position. For added support, and upper draw bar 280 is provided about post 273 through means of an aperture in one end thereof and with the opposite end of draw bar 280 being secured to draw bar 271 through means of a bolt 281. The outer ends of draw bars 271 and 280 are provided with apertures for receiving the stop shaft 282 of a ball hitch including a ball 283.

Referring to FIG. 23, ball 283 is receivable in tongue bar 240 which is hollow and slotted at 240a along its axis for inserting the ball therein. As indicated in FIG. 23, during assembly ball 283 must first be inserted in a collar 284 having a slot 285 through which stop shaft 282 extends with the ball located in the collar. Collar 284 is then placed over tongue bar 240 prior to assembly of struts 230, and after the ball hitch and collar are so installed, pin 234 (see FIG. 2) is inserted through tongue bar 240 and apertures 233 (see FIG. 17) in the struts 230 to pivotally connect the struts to the tongue bar as well as to maintain collar 284 and ball hitch assembled on the tongue bar.

Referring to FIG. 23, after the ball hitch and collar are installed, a lock nut (not shown) is placed on the protruding end of the shaft 282, which is provided with threads shown in FIG. 23, to secure the assembly.

Draw bars 270, 271 and 280 are dimensioned so that in the position shown in FIG. 15, the cart assembly will be hitched to the mower with ball hitch 283 being in alignment with the center of the inlet opening 110 of the canopy, that is, a vertical plane passing through the center of inlet opening 110 and parallel to the longitudinal axis of the cart will pass through the center of the ball hitch. Moreover, to coordinate motion of the cart assembly relative to the chutes 100, 102, 112 and motion of the cart assembly relative to the hitch point to the mower, the hitch point determined by ball hitch 283 is positioned as close as possible to the vertical plane of the front canopy wall 200 or the inlet opening 110. Additionally in the preferred embodiment, inlet opening 110 in front wall 200 of the canopy is offset from the center of the canopy to accommodate the position of the chutes 101, 102. This positioning of the parts has been found to be most effective in permitting the cart assembly to properly track the mower without effecting the flow of grass clippings or leaves through the chute system to the cart assembly. The hitch assembly described will, of course, permit the cart to be moved into pivoted positions about the vertical axis of the ball hitch relative to the mower, such as when the mower is moving over a curved path.

In assembling the draw bars of the hitch assembly, upper draw bar 280 is inserted on post 273 from the top of the post while draw bar 271 is inserted on the post from the bottom of the post. Draw bar 270 may then be secured at one end by bolt 274 to rear frame member 272, and the other end of draw bar 270 may be secured to draw bar 271 through means of bolt 276 in the desired selected position.

When the cart is to be used purely for hauling rather than collection of grass or leaves, etc., it is preferred that the ball hitch be mounted so as to coincide with the longitudinal axis of the mower frame as shown in FIG. 16. This positioning is achieved by placing the bolt 276 through the middle aperture 275 of draw bar 270.

The grass collection system of the present invention may also be replaced by a conventional grass collector assembly mounted to posts 273 at the rear of the mower frame as shown in U.S. Pat. No. 3,716,977. In this instance, the cart assembly is, of course, first unhitched from the mower and other chutes are utilized in place of chutes 100, 192. However, the same improved blade housing is utilized which will significantly increase the flow of grass clippings from the blade housing to the grass collector.

What is claimed is:

1. A cart assembly for receiving grass clippings, leaves or other similar matter harvested from the ground and discharged by a lawn mower or the like to the rear of which the cart assembly is hitched; the cart assembly comprising, a cart having wheel support means including a transverse axle and two wheels and further having front and rear ends mounted with the wheels located intermediate the front and rear ends in spaced relationship said cart being mounted on said axle for pivoting movement in a vertical plane for purposes of dumping the cart, a canopy defining an enclosure above the cart for receiving harvested matter, means pivotally mounting the canopy to a front end portion of the cart for movement between a closed position overlying the cart for receiving harvested matter and an open position raised from the cart for discharging harvested matter from the cart, and means for pivoting the cart downwardly to the rear about said axis relative to the wheel support means when the canopy is moved to said open position for discharging the contents of the cart and canopy by gravity through the rear of the cart, said last defined means including a strut pivotally connected to the canopy and pivotally connected relative to said wheel support means to cause said cart to be pivoted downwardly about said axle in response to pivoting of the canopy upwardly relative to said cart.

2. The cart assembly defined in claim 1 including a tongue connected to said wheel support means for hitching the cart to the rear of a mower, said strut being connected to the tongue, said cart being movable relative to the tongue when moving to said open and closed positions thereof.

3. The cart assembly defined in claim 2 wherein said tongue projects from below the front end of the cart and said strut is connected to the tongue forwardly of the cart and to a front portion of the canopy raised from the cart.

4. The cart assembly defined in claim 2 including latch means releasably securing the cart to the tongue.

5. The cart assembly defined in claim 4 including catch means releasably securing the canopy to the cart.

6. The cart assembly defined in claim 1 including catch means releasably securing the canopy to the cart.

7. The cart assembly defined in claim 1 wherein said canopy includes frame portions and sheet material mounted on the frame portions to define said canopy enclosure, said frame portions of the canopy including front members upstanding from the front end of the cart on opposite sides of the cart, base members extending along opposite sides of the cart, and central members extending on opposite sides of the cart.

8. The cart assembly defined in claim 1 wherein said canopy has a front wall extending above the front end of the cart, said front wall of the canopy having an inlet opening for receiving a dicharge chute from an associated lawn mower.

9. Apparatus for cutting grass and collecting grass clippings, leaves or other like matter, the apparatus comprising in combination; a riding lawn mower having a blade housing including a cutting blade for cutting grass, said blade housing having a discharge port for discharging grass clippings and other matter outwardly of the blade housing, a grass collecting cart, a single hitch means hitching said cart to the rear of the mower to trail the mower over the ground surface while permitting the cart to pivot relative to the mower in a horizontal plane, said cart assembly including means defining an enclosure for receiving grass clippings or other matter harvested by the mower, said enclosure including an inlet port, and conduit means extending in a straight path between the discharge port of the blade housing and the inlet port of the enclosure for conveying grass clippings or other harvested matter from the blade housing to the enclosure, said conduit means including at least two coaxially arranged telescoping chutes with one chute being located partially within the other and with the chutes being movable relative to each other along the axis of the conduit means, and wherein said chutes are free of any positive connection therebetween such that they are free to rotate about their longitudinal axis relative to each other, and wherein one of the telescoping chutes is received in the inlet port of the enclosure but is movble within said inlet port relative to the enclosure, and wherein said enclosure includes a front wall facing the mower, said inlet port being located in said front wall, said hitch means being located below said inlet port and to one side of the mower in a vertical plane passing generally through the center of said inlet port.

10. The apparatus defined in claim 9 wherein said hitch means is located adjacent to a vertical plane passing through said front wall of said enclosure.

11. The apparatus defined in claim 9 wherein said discharge port is located generally on one side of the blade housing and wherein said blade housing includes a generally circular deck and a cylindrical continuous peripheral skirt depending from the deck and having an annular continuous inturned lip projecting inwardly from the bottom of the skirt in a generally horizontal plane and with a uniform diameter and width and extending continuously without interruption for 360° throughout the extent of the skirt and terminating in a continuously circular free edge lying in said horizontal plane, said lip being integral with the skirt along a uniformly curved juncture between the skirt and the lip, said cutting blade having cutting edges on opposite end portions thereof located generally in a horizontal plane extending through the bottom of the blade housing above the inturned lip, said cutting blade having air impellers mounted on its opposite end portions, said air impellers each including an upstanding portion, said skirt projecting downwardly from the deck with sufficient depth leaving substantial space between upper extremities of the air impellers and the deck for defining a flow path for grass clippings or other matter harvested by the cutting blade, said blade housing, enclosure and conduit means being free of any air flow inducing means other than said cutting blade and air impellers.

12. The apparatus defined in claim 9 wherein said one telescoping chute includes a curved elbow portion received in the inlet port of the enclosure.

13. The apparatus defined in claim 12 wherein the other telescoping chute is fixed relative to the blade housing.

14. The apparatus defined in claim 9 wherein the inlet port in the front wall of the enclosure is offset to one side of the enclosure and is generally aligned in plan view over said hitch means.

15. Apparatus defined in claim 9 wherein the chute which is located upstream of the flow of grass clippings therethrough relative to the other chute is located within the other chute.

16. Apparatus defined in claim 9 wherein said enclosure includes a flexible front wall, said inlet port being located within said front wall.

17. In a lawn mower or the like, a blade housing having a generally circular deck extending in a horizontal plane, a cylindrical skirt depending from the deck and defining therewith an enclosure, said skirt being formed integral with the deck along a uniformly curved juncture between the deck and the skirt, said skirt having a circular rolled lip projecting inwardly from the lower extremity of the skirt in a generally horizontal plane and with a uniform diameter and width and extending continously without interruption for three hundred sixty degrees (360°) througout the extent of the skirt and terminating in an inner continously circular free edge lying in said horizontal plane said lip being roll-formed integral with the skirt along a uniformly curved juncture between the skirt and the lip, a cutting blade mounted generally in the center of the housing for rotation in a horizontal plane about a vertical axis which coincides with the diametrical center of said lip, said blade having on opposite end portions cutting edges lying in a horizontal plane above said lip and air impellers upstanding from opposite end portions of the blade for impelling air against the skirt and deck, the skirt having a depth and the impellers having a height such that a substantial continuous uninterrupted annular space remains above the impellers between the impellers and the deck providing an annular conduit for receiving and conveying grass clippings and other matter to be harvested upwardly from the blade, and a discharge port in the deck on one side of the deck adjacent the skirt and also extending a limited amount in the skirt along an upper portion of the skirt adjacent the deck, said discharge port being in direct communication with the annular conduit for directing grass clippings from the annular conduit outwardly of the blade housing.

18. The lawn mower defined in claim 17 wherein the discharge port has a longitudinal axis extending generally in the forward-rearward direction of the mower, and wherein the discharge port further has a rear edge portion in the deck curved from the skirt inwardly into the deck in a direction counter to the direction of blade rotation and terminating at a point intermediate the skirt and the center of the blade housing but located closer to the skirt.

19. The lawn mower defined in claim 18 wherein there is further included a baffle fixed to the deck and having a guide portion projecting downwardly from the deck at an incline along the rear edge portion of the discharge port and extending with the same contour as the rear edge portion of the discharge port for guiding the conveyance of grass clippings or other harvested matter upwardly and rearwardly at an incline through the discharge port, the lowermost portion of said guide portion lying in a plane above the uppermost portions of said air impellers.

20. The lawn mower defined in claim 19 wherein said baffle has a lower flange portion projecting from the bottom of said guide portion in a generally horizontal plane in a direction away from the discharge port for preventing grass clippings from adhering to the bottom of the guide portion.

21. The lawn mower defined in claim 19 wherein the baffle has a reversely curved extremity portion extending through the skirt at the discharge port and terminating on the outside of the skirt.

22. The lawn mower defined in claim 18 wherein said discharge port has an inner intermediate edge portion extending generally along a straight line parallel to the longitudinal axis of the mower in the forward-rearward direction of the mower and a front edge portion extending along a curved path opposite to the direction of the rear edge portion of the port and with a radius of curvature less than the radius of curvature of the rear edge portion of the port such that the discharge port has a generally egg shape elongated in the forward-rearward longitudinal direction of the mower.

23. The lawn mower defined in claim 17 wherein the depth of the space between the top extremities of the air impellers and the deck is at least as great as the depth from the top extremities of the air impellers to the bottom of the skirt.

24. In the lawn mower as defined in claim 23 wherein the vertical space between the cutting edges of the blade and the lip is about three sixteenths to three eighths of an inch and wherein the cutting edges of the blade radially overlap the lip a distance of about one eighth to one fourth of an inch.

25. In the lawn mower defined in claim 19 wherein the vertical space between the lowermost point of the baffle and the uppermost points of the air impellers is about one fourth to one half of an inch.

26. In a lawn mower having a blade housing including a deck and a peripheral skirt depending from the deck and defining therewith an enclosure, a cutting blade mounted in the housing for rotation in a horizontal plane, and means including a discharge port in the deck on one side of the deck adjacent the skirt for discharging grass clippings or the like from the blade housing; the improvement comprising, a deflector hinged to the deck along a hinge axis at one side and adjacent to the discharge port to be movable between a closed position covering the discharge port in the deck and an open position raised above the discharge port and the deck, said deflector having a depending flange side wall portion projecting in a vertical plane generally at a tangent to the skirt when the deflector is in the closed position, and latch means on the flange side wall portion of the deflector and the skirt for releasably securing the deflector in said closed position thereof, and wherein there is further included a hinge mounting member fixed to the deck along one side of the discharge port and including hinge means pivotally mounting said deflector for movement between said open and closed positions thereof, said hinge mounting member having means spaced above said deck for defining sockets for mounting to the blade housing, an adaptor chute overlying said discharge port and forming an extension thereof when the deflector plate is in the open position, and an adaptor chute having mounting lugs dimensioned to be received in said sockets of the hinge mounting member for mounting the adaptor chute to the blade housing over the discharge port.

27. In the lawn mower defined in claim 26 wherein said adaptor chute has fixed thereon a catch for securing a chute to the adaptor chute for conveying grass clippings rearwardly of the mower from the adaptor chute to a collection point at the rear of the mower.

28. The lawn mower defined in claim 26 wherein said adaptor chute has a spacer element fixed thereon projecting upwardly from the adaptor chute for engaging the deflector plate when the deflector plate is in the open position to prevent downward movement of the deflector plate.

29. In a lawn mower having a blade housing including a deck and a peripheral skirt depending from the deck and defining therewith an enclosure and a cutting blade mounted in the housing for rotation in a horizontal plane, said blade having on opposite end portions cutting edges; the improvement comprising, a discharge port in the deck on one side of the deck adjacent the skirt and also extending a limited amount in the skirt along an upper portion of the skirt adjacent the deck, a baffle fixed to the deck and having a guide portion projecting downwardly from the deck along a rear edge portion of the discharge port and extending with the same contour as the rear edge portion of the discharge port for guiding the conveyance of grass clippings or other harvested matter upwardly through the discharge port, the lowermost portion of said guide portion lying in a plane above the opposite end portions of the cutting blade, the baffle having an extremity portion extending through the skirt at the discharge port and terminating on the outside of the skirt, and wherein the baffle includes a generally horizontal flange portion projecting from the bottom of the guide portion away from the discharge port in the direction of travel of the cutting blade, and wherein the guide portion of the baffle projects downwardly from the deck at an incline in the direction opposite the direction of the travel of the blade, and wherein the discharge port has a curved rear edge portion and wherein the guide portion of the baffle follows the curved contour of the rear edge portion of the discharge port.

30. A canopy for a grass collecting cart to be used in conjunction with a lawn mower or the like with the cart and canopy trailing the lawn mower for receiving grass clippings or similar harvested matter from the lawn mower, the canopy comprising, a base frame including elongated opposite side members laterally spaced relative to each other, a front frame including upstanding elongated legs and a top cross piece interconnecting the legs, means interconnecting the legs of the front frame and the side members of the base frame for moving the base and front frames towards and away from each other between a collapsed position where they lie adjacent each other and an erected position wherein the legs project upwardly from the plane of the base frame, a pair of struts each having their opposite ends releasably connected to side members of the base frame and the legs of the front frame, flexible covering material attached to the base and front frame members for defining an enclosure when the base and front frames are in the erected position, said covering material defining a front wall extending generally vertically between the legs of the front frame and further defining opposite side walls extending generally vertically above the side members of the base frame when the base and front frames are in erected position, said covering material having an opening in said front wall for defining an inlet port for receiving a discharge chute, said means interconnecting said base and front frame including pivot means adapted to be pivotally mounted to a grass collecting cart to allow the canopy to be swung as a unit in a vertical plane relative to the cart for discharge purposes, and a pair of struts having ends pivotally connected to the legs of the front frame and having opposite ends adapted to be pivotally connected to a tongue bar of an associated cart for controlling movement of the canopy relative to an associated cart.

31. The canopy defined in claim 30 further including a central frame and means connecting the central frame to at least one of said base and front frames at the juncture between the front and base frame for movement between a collapsed position lying adjacent the base and front frames and an erected position extending diagonally from said juncture along the side walls of the covering material, the covering material defining a top wall between the top cross piece of the front frame and a top portion of the central frame and defining a rear wall between the top portion of the central frame and the base frame, said covering material having in its side walls means for holding the central frame in the erected position.

32. The canopy defined in claim 30 wherein said side walls of said covering material each include two spaced layers with one layer being foraminous and located inwardly of the other layer to permit discharge of air from the canopy between said layers.

33. In apparatus for cutting grass and collecting grass clippings, leaves or other like matter, including a riding lawn mower, a grass collecting assembly including a wheeled cart and canopy hitched to the rear of a mower for receiving grass clippings or other harvested matter from the mower, and a conduit means extending upwardly and rearwardly of the mower between the mower and the grass collecting assembly for conveying the harvested matter from the mower to the grass collecting assembly; the improvement comprising, a blade housing included in the mower comprising a generally circular deck and a cylindrical continuous peripheral skirt depending from the deck and having an annular continuous inturned lip projecting inwardly from the bottom of the skirt in a generally horizontal plane and with a uniform diameter and width and extending continuously without interruption for 360° throughout the extent of the skirt and terminating in an inner continuously circular free edge lying in said horizontal plane, said lip being formed integral with the skirt along a uniformly curved juncture between the skirt and the lip, a cutting blade mounted generally in the center of the blade housing for rotation in a horizontal plane about a vertical axis which coincides with the diametrical center of said lip, said blade having on opposite end portions cutting edges lying in a horizontal plane above said lip, and air impellers upstanding from opppsite end portions of the blade for impelling air against the skirt and deck, the skirt having a depth and the impellers having a height such that a substantial continuous uninterrupted annular space remains above the impellers between the impellers and the deck providing an annular conduit for receiving and conveying grass clippings and other matter to be harvested upwardly from the blade, a discharge port in the deck on one side of the deck adjacent the skirt and also extending a limited amount in the skirt along an upper portion of the skirt adjacent the deck, said discharge port being in direct communication with the annular conduit for directing grass clippings from the annular conduit outwardly and upwardly of the blade housing; an adaptor chute included within said conduit means attached to the housing over said discharge port and defining a curved path to conform to the path of the grass clippings as they emerge from the discharge port without changing direction, and wherein said conduit means includes at least one extension chute extending from the adaptor in a straight path upwardly and rearwardly to the grass collecting assembly with an axis coinciding with the axis of the adaptor chute such that the grass clippings emerging through the discharge port are conveyed in a substantially undeviating path from the discharge port to the grass collecting assembly, and wherein said blade housing, said conduit means and said grass collecting assembly are free of any air flow inducing means for conveying the grass clippings to the grass collecting assembly, other than the cutting blade and air impellers and the formation of the blade housing, including the lip as aforesaid.

* * * * *

UNITED STATES PATENT AND TRADEMARK OFFICE
CERTIFICATE OF CORRECTION

PATENT NO. : 4,158,279
DATED : June 19, 1979
INVENTOR(S) : HAROLD P. JACKSON

It is certified that error appears in the above-identified patent and that said Letters Patent are hereby corrected as shown below:

Column 2, line 50, change "into" to -- onto --.

Column 7, line 51, change "slightl" to -- slightly --.

Column 9, line 19, change "witht he" to -- with the --.

Column 10, line 10, change "fstened" to -- fastened --;
            line 20, change "incudes" to -- includes --;
            line 38, change "cute" to -- chute --.

Column 12, line 9, change "flane" to -- flange --.

Signed and Sealed this

Twenty-seventh Day of November 1979

[SEAL]

Attest:

RUTH C. MASON
Attesting Officer

LUTRELLE F. PARKER
Acting Commissioner of Patents and Trademarks